(12) United States Patent
Jin

(10) Patent No.: US 10,762,696 B2
(45) Date of Patent: Sep. 1, 2020

(54) GRAPHIC PROCESSOR PERFORMING SAMPLING-BASED RENDERING AND METHOD OF OPERATING THE SAME

(71) Applicant: SAMSUNG ELECTRONICS CO., LTD., Suwon-si, Gyeonggi-Do (KR)

(72) Inventor: Seung-hun Jin, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 16/048,905

(22) Filed: Jul. 30, 2018

(65) Prior Publication Data

US 2019/0206121 A1    Jul. 4, 2019

(30) Foreign Application Priority Data

Dec. 28, 2017    (KR) .................. 10-2017-0182640

(51) Int. Cl.
*G06T 15/80*    (2011.01)
*G06T 15/04*    (2011.01)
*G06T 15/00*    (2011.01)
*G06T 11/00*    (2006.01)

(52) U.S. Cl.
CPC ............. *G06T 15/80* (2013.01); *G06T 11/00* (2013.01); *G06T 15/005* (2013.01); *G06T 15/04* (2013.01)

(58) Field of Classification Search
CPC ....... G06T 15/80; G06T 15/005; G06T 15/04; G06T 11/001
See application file for complete search history.

(56) References Cited

U.S. PATENT DOCUMENTS

| | | |
|---|---|---|
| 8,044,956 B1 | 10/2011 | Kilgard |
| 9,449,421 B2 | 9/2016 | Kwon et al. |
| 9,607,356 B2 | 3/2017 | Lassen et al. |
| 9,710,894 B2 | 7/2017 | Lottes |
| 2002/0140706 A1 | 10/2002 | Peterson et al. |
| 2015/0302545 A1 | 10/2015 | Harris et al. |
| 2015/0379727 A1 | 12/2015 | Golas et al. |
| 2016/0314610 A1 | 10/2016 | Lee et al. |

FOREIGN PATENT DOCUMENTS

KR    1020160001663    1/2016

*Primary Examiner* — Antonio A Caschera
(74) *Attorney, Agent, or Firm* — F. Chau & Associates, LLC

(57) ABSTRACT

A method of operating a graphic processor performing sampling-based rendering involves intermediate rendering by shading-processing some fragments of a first frame by using a first sample candidate map having a first pattern. Further intermediate rendering may also be performed by shading-processing some fragments of a second frame by using a first sample candidate map having a second pattern. Other fragments of the second frame may be additionally sampled, where these other fragments may be determined based on comparing a shading processing result of the first frame and a shading processing result of the second frame. Final rendering may be performed by shading-processing the additionally sampled fragments.

19 Claims, 19 Drawing Sheets

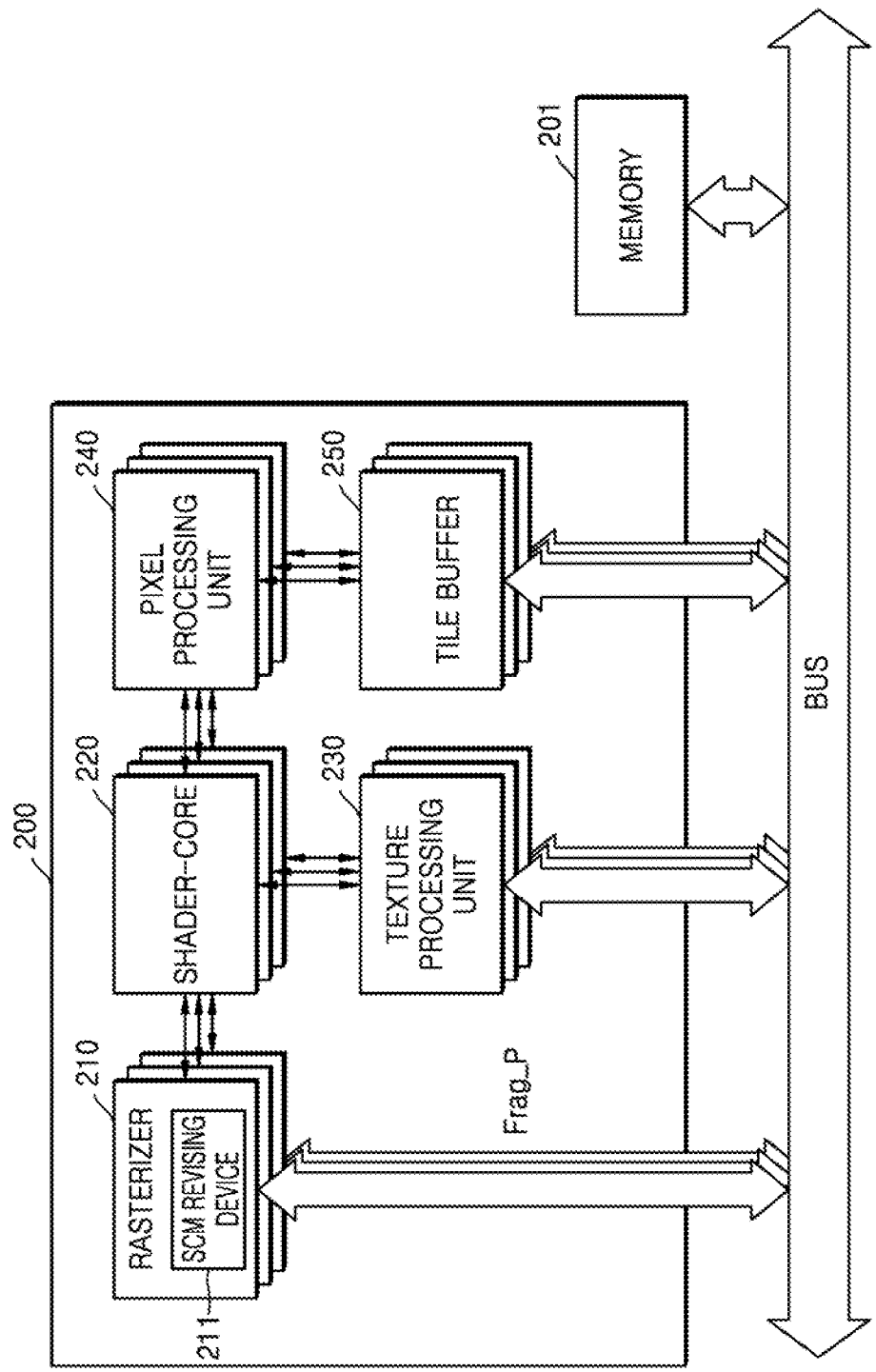

FIG. 7A
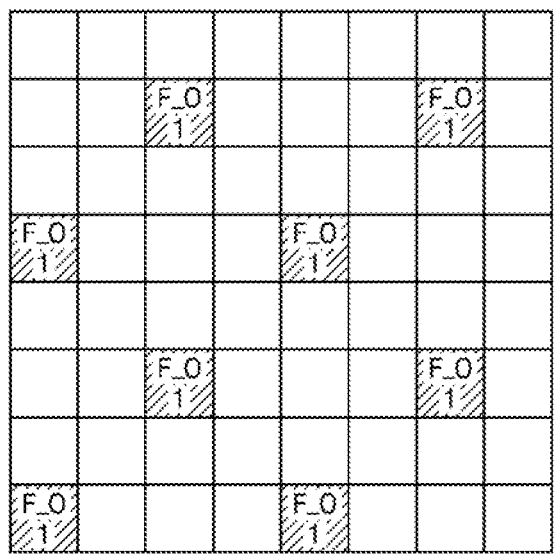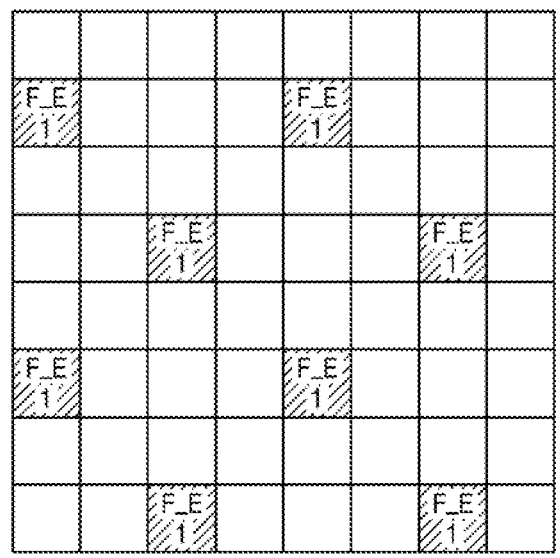
SCM_1 (Frame_Odd)    SCM_1 (Frame_Even)
FIG. 7B
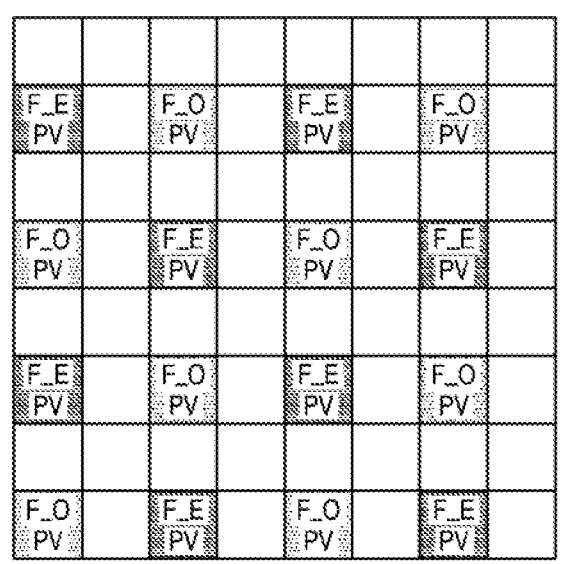

GRAPHIC PROCESSOR PERFORMING SAMPLING-BASED RENDERING AND METHOD OF OPERATING THE SAME

CROSS-REFERENCE TO RELATED APPLICATION

This application claims the benefit of Korean Patent Application No. 10-2017-01.82640, filed on Dec. 28, 2017, in the Korean Intellectual Property Office, the disclosure of which is incorporated by reference herein in its entirety.

BACKGROUND

Technical Field

The inventive concept relates generally to graphic processing, and more particularly, to a graphic processor performing sampling-based rendering and a method of operating the same.

Discussion of the Related Art

A rendering system may include a graphic processor such as a graphic processing unit (CPU), as a device for performing a graphic operation. The GPU may perform fragment shading processing for calculating fragment values of video frames to be rendered (where a fragment may correspond to a pixel). Such fragment shading processing occupies a large portion of the total graphic processing operations due to its high complexity.

One way to reduce an amount of fragment shading processing for a given frame is to shading-process only some of the fragments constituting the frame. Color values for the remaining fragments of the frame may be obtained by interpolation between the fragments that were shading-processed, or "advection" which involves re-using pixel data from a previous frame. The amount of processing is reduced in this manner because interpolation or advection are simpler processing tasks than shading-processing. With this method, the fragments that are shading-processed are fragments that are said to be "sampled" whereas the other fragments are said to be unsampled. While processing is reduced with this approach, if a sampling rate is too low, rendering quality may suffer. If the sampling rate is too high, the resources of a GPU may not be used efficiently.

SUMMARY

The inventive concept provides a graphic processor implementing a fragment sampling method for rendering, which is capable of improving the accuracy of shading processing while reducing an amount of fragment shading processing.

According to an aspect of the inventive concept, there is provided a method of operating a graphic processor, which involves performing intermediate rendering by shading-processing some fragments of a first frame by using a first sample candidate map having a first pattern. Further intermediate rendering may be performed by shading-processing some fragments of a second frame by using a first sample candidate map having a second pattern. The method may additionally sample other fragments of the second frame which are determined based on comparing a shading processing result of the first frame and a shading processing result of the second frame. Final rendering is performed by shading-processing the additionally sampled fragments.

According to another aspect of the inventive concept, there is provided a graphic processor including: an intermediate rendering processor performing shading processing on some of a plurality of fragments of a current frame according to sampling information of a sample candidate map; a sample candidate map revising circuit configured to change the sampling information of the sample candidate map to thereby generate a changed sample candidate map, based on a comparison of a shading processing result of a previous frame and a shading processing result of the current frame. A final rendering processor performs shading processing on fragments of the current frame additionally sampled by the changed sample candidate map among the fragments that are not shading-processed by the intermediate rendering processor.

In still another aspect, a non-transitory computer-readable recording medium stores instructions that, when executed by at least one processor, implement a method for rendering frames of a video. Here, the method may include intermediately rendering of a current frame by shading-processing a subset of pixels constituting the current frame. The subset of pixels is selected based on a sample candidate map, and includes a first pixel at a first location of a pixel grid and a second pixel at a second location of the pixel grid. The first pixel has a first pixel value and the second pixel has a second pixel value as a result of the intermediate rendering. The method further obtains pixel values of pixels computed in rendering of a previous frame to the current frame; and determines whether to interpolation-process or shading-process a third pixel of the current frame at a third location of the pixel grid in between the first location and the second location, based on a comparison of: a pixel value of the previous frame of a pixel mapped to a fourth location of the pixel grid proximate to each of the first and second locations, with (ii) the first pixel value and/or the second pixel value.

BRIEF DESCRIPTION OF DRAWINGS

Embodiments of the inventive concept will be more clearly understood from the following detailed description taken in conjunction with the accompanying drawings in which:

FIG. 4 is a block diagram illustrating an implementation example of a graphic processor according to an example embodiment of the inventive concept;

FIGS. 7A, 7B, and 8 are diagrams illustrating an example of performing sample candidate map revision by using data of at least two frames;

DETAILED DESCRIPTION OF EMBODIMENTS

Hereinafter, embodiments of the inventive concept will be described in detail with reference to the accompanying drawings.

As used herein, a "fragment" corresponds to a basic unit of graphic operation processing. A fragment may be a pixel of a primitive. Hereinbelow, the terms fragment and pixel may be used interchangeably. For example, fragment shading may be referred to as pixel shading, and fragment sampling may be referred to as pixel sampling.

Figure 1:
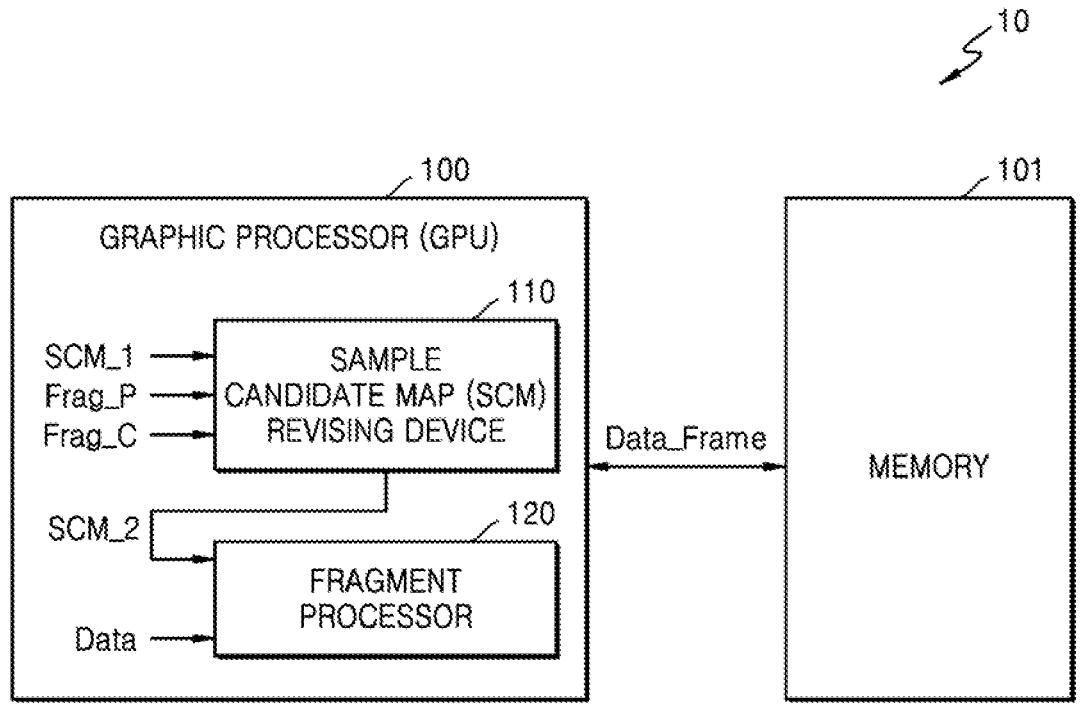
FIG. 1 is a block diagram illustrating a rendering system according to an example embodiment of the inventive concept.

FIG. 1 is a block diagram illustrating a rendering system, 10, according to an example embodiment of the inventive concept. Rendering system 10 may include a graphic processor 100 and a memory 101. Graphic processor 100 may perform graphic operations in the rendering system 10 to perform rendering. As an example, the graphic processor 100 may receive a three-dimensional (3D) object and output a two-dimensional (2D) rendered image as a rendering processing result thereof. A graphics processor may be implemented by various types of processors, of which a typical example is a graphic processing unit (GPU) as exemplified in FIG. 1 and in other examples below.

The graphic processor 100 may be configured to perform tile-based rendering, and for this purpose, the graphic processor 100 may include graphics pipelines which may process graphic data in parallel. Each graphics pipeline may include various types of configurations for graphic operations, and may be configured by hardware and/or software.

Although not illustrated in FIG. 1, the rendering system 10 may further include a central processing unit (CPU) for controlling an overall system operation, and various types of buses such as Peripheral Component Interconnect (PCI) buses and PCI Express buses for communication between components. Rendering system 10 may also include, for example, a desktop computer, a notebook computer, a smart phone, a personal digital assistant (PDA), a portable media player, a video game console, a television (TV) set-top box, a tablet device, an e-book reader, or a wearable device, but is not limited thereto and may correspond to various types of electronic systems.

The graphic processor 100 may receive rendering-related information based on various Application Program Interface (API) standards such as Open Graphic(s) Library (OpenGL), DirectX, and Compute Unified Device Architecture (CUDA) and may perform various graphic operations such as shading processing and texturing processing. Also, the memory 101 may be integrated in the same semiconductor chip as the graphic processor 100 or may be implemented as a different semiconductor chip, and may correspond to random access memory such as dynamic random access memory (DRAM) or static random access memory (SRAM) or may correspond to a memory device such as read-only memory (ROM), electrically erasable programmable read-only memory (EEPROM), or a flash memory. The memory 101 may store graphic data to be processed by the graphic processor 100 or may store graphic data (e.g., frame data) already processed by the graphic processor 100.

As an operation example, the graphic processor 100 may receive a vertex or vertexes and generate a primitive through operation processing on the received vertex(es). Graphic processor 100 may generate a set of fragments representing a primitive. Graphic processor 100 may perform fragment shading processing to calculate the values of fragments.

The fragment shading processing may occupy a large portion of the total graphic operation amount due to its high complexity. As discussed earlier, to reduce the complexity of fragment shading, a method may be applied to calculate fragment values by performing sampling and shading processing on only some of the fragments of a given frame (or tile/primitive) and performing an "advection" or interpolation operation on the other fragments of the frame. The amount of processing is reduced in this manner because interpolation and advection may each be less processor-intensive than shading-processing. In the description hereafter, fragments that are shading-processed are fragments that are said to be "sampled" fragments whereas the fragments having values determined by interpolation or advection are said to be unsampled, non-sampled, or "derived" fragments. When a sampling rate is low, the value of a fragment may be determined through interpolation between sampled fragments, which have values obtained through actual shading processing. In this case, since the fragment value calculated by interpolation processing may be greatly different from the actual value thereof (i.e., otherwise obtainable through shading processing), image quality degradation may occur.

According to an example embodiment of the inventive concept, the graphic processor 100 may include a sample candidate map (SCM) revising device 110 and a fragment processor 120. For example, in a primitive unit, a primitive may include a plurality of fragments, and the graphic processor 100 may sample only some of the plurality of fragments and selectively perform shading processing thereon. As an example, a sample candidate map (e.g., a first sample candidate map SCM_1) having a pattern of sampling information for sampling some fragments may be generated in the graphic processor 100. Shading processing results (e.g., fragment values) of the sampled fragments mapped to the sampling information of the pattern may be calculated through shading processing based on the first sample candidate map SCM_1. Fragments that are not designated through the sample candidate map as fragments to be sampled may have their values obtained by interpolation between the sampled fragments.

In accordance with the inventive concept, to reduce the occurrence of image degradation due to potential instances of inaccurate interpolation, a sample candidate map may be dynamically modified. As an example, it may be assumed that an instance of inaccurate interpolation is likely if fragments corresponding to proximate but noncontiguous sample positions of a sample candidate map have values differing by more than a threshold. In this case, it may be likely that the sampled fragments are fragments of different objects or different portions of a texture (applied to a single object) having significantly different colors (or luminance).

In this situation, an interpolation between the sampled fragments may yield an inaccurate value for a derived fragment therebetween. To this end, the SCM revising device 110 may detect such a potential condition and revise the sample candidate map to add a sample fragment at a location that would otherwise result in an inaccurate interpolated fragment. Moreover, instead of or in addition to just comparing values of sampled fragments of a current frame at a first sample position proximate to a second sample position, the SCM revising device 110 may detect the potential condition by comparing a fragment value of a sampled fragment in the current frame at the first position with the value of a sampled fragment of a previous frame mapped to a location in between the first and second positions of the current frame (as in an advection method). This approach, explained further below, may result in a more accurate edge detection for the purpose of selecting additional sample locations for revising the sample candidate map.

To this end, the SCM revising device 110 may generate a second sample candidate map SCM_2 by revising the sampling information of the first sample candidate map SCM_1 that it previously received. As an implementation example, the first sample candidate map SCM_1 may include sampling information representing the position of fragments (e.g., first fragments) to be shading-processed among a plurality of fragments in a primitive, tile or frame. The second sample candidate map SCM_2 may include sampling information representing the position of fragments (e.g., second fragments) to be additionally shading-processed among fragments other than the first fragments. As an example, the second sample candidate map SCM_2 may include information representing the position of first fragments and second fragments among a plurality of fragments in a primitive, tile or frame. As another example, the second sample candidate map SCM_2 may be implemented in a form including information representing only the position of second fragments among a plurality of fragments in the primitive, tile or frame.

In embodiments of the inventive concept, shading processing for rendering may be performed by graphic processor 100 two or more times sequentially on a plurality of fragments, so that shading processing based on the first sample candidate map SCM_1 may be designated intermediate rendering processing and shading processing based on the second sample candidate map SCM_2 may be designated final rendering processing. In the following discussion, the terms "shading processing" and "rendering processing" may be used interchangeably, and for example, intermediate rendering processing may be referred to as intermediate shading processing and final rendering processing may be referred to as final shading processing. Meanwhile, the graphic processor 100 may include a first SCM generating device (not illustrated) for generating a first sample candidate map SCM_1. The SCM revising device 110 may be referred to as a second SCM generating device because the SCM revising device 110 generates a second sample candidate map SCM_2.

According to an embodiment, the SCM revising device 110 may perform a revising operation based on various types of information, e.g., fragment values Frag_C and Frag_P. For example, the SCM revising device 110 may receive fragment value Frag_C calculated through shading processing in a current frame of a video to be rendered and displayed through a display device, and fragment value Frag_P calculated through shading processing in a previous frame of the video and perform a revising operation through an operation based thereon. For example, the values of Frag_C and Frag_P may be compared to determine whether an edge or the like exists between proximate but non-contiguous sample positions, such that an additional sample(s) should be inserted. Frag_P may be a fragment value from the previous frame that could potentially be re-used for a non-sampled fragment in the current frame through advection. As an example, if inter-frame motion of an object rendered in both the previous frame and the current frame is minimal (that is, a substantially static scene condition exists between the frames), it may be assumed that a fragment at a common location of a pixel grid may have the same value Frag_P in both frames. In a more complex case, if an amount of inter-frame motion of the object is significant and known, a fragment value Frag_P of a fragment at a first location of a pixel grid can be mapped, using motion vectors, to a second location of the pixel grid in the current frame. In this case, the fragment value Frag_P at the first location determined in the previous frame can be re-used at the second location in the current frame.

The sampling information of the first sample candidate map SCM_1 may have various types of patterns. For example, the pattern (first pattern) of the first sample candidate map SCM_1 used in intermediate rendering processing in a current frame may differ from the pattern (second pattern) of the first sample candidate map SCM_1 used in intermediate rendering processing in a previous frame. (The difference in patterns may be due to a dithering technique to reduce visual artifacts, discussed later.) The fragment values Frag_C, and Frag_P used in the revising operation may be values calculated by the intermediate rendering processing, and thus, when considering at least the case of a substantially static condition between frames noted above, the position of a fragment in a current frame, represented by Frag_C, may differ from the position of a fragment in the previous frame, represented by Frag_P, used in the revising operation.

When the first sample candidate map SCM_1 has a coarse pattern due to its low sampling rate, the spacing between fragments whose values are calculated through the intermediate rendering processing may be relatively large. In this case, before interpolation processing is performed on the fragments on which intermediate rendering processing is not performed, the above sample candidate map revising operation may be performed to further select a fragment requiring final rendering processing, and according to an embodiment of the inventive concept, the fragment values of at least two frames may be used to improve the selection accuracy of a fragment requiring final rendering processing.

For instance, according to an example embodiment of the inventive concept, even when the first sample candidate map SCM_1 has a coarse pattern in any one frame, a sample candidate map revising operation may be performed by using a fragment value of a current frame and a fragment value of a previous frame and thus a revising operation may be performed based on the fragment values of positions having a relatively short spacing. For instance, since a sample candidate map revising operation may be performed by using a fragment value according to a substantially fine pattern, the selection accuracy of a fragment requiring actual shading processing (such as an edge) may be improved.

When a second sample candidate map SCM_2 is generated according to the above operation, the second sample candidate map SCM_2 and graphic data Data to be processed may be provided to the fragment processor 120. The fragment processor 120 may perform shading processing on a fragment sampled through the second sample candidate map SCM_2 and calculate a fragment value according thereto. Frame data Data_Frame for the current frame may be generated through the above process and stored in the memory 101.

Figure 2:
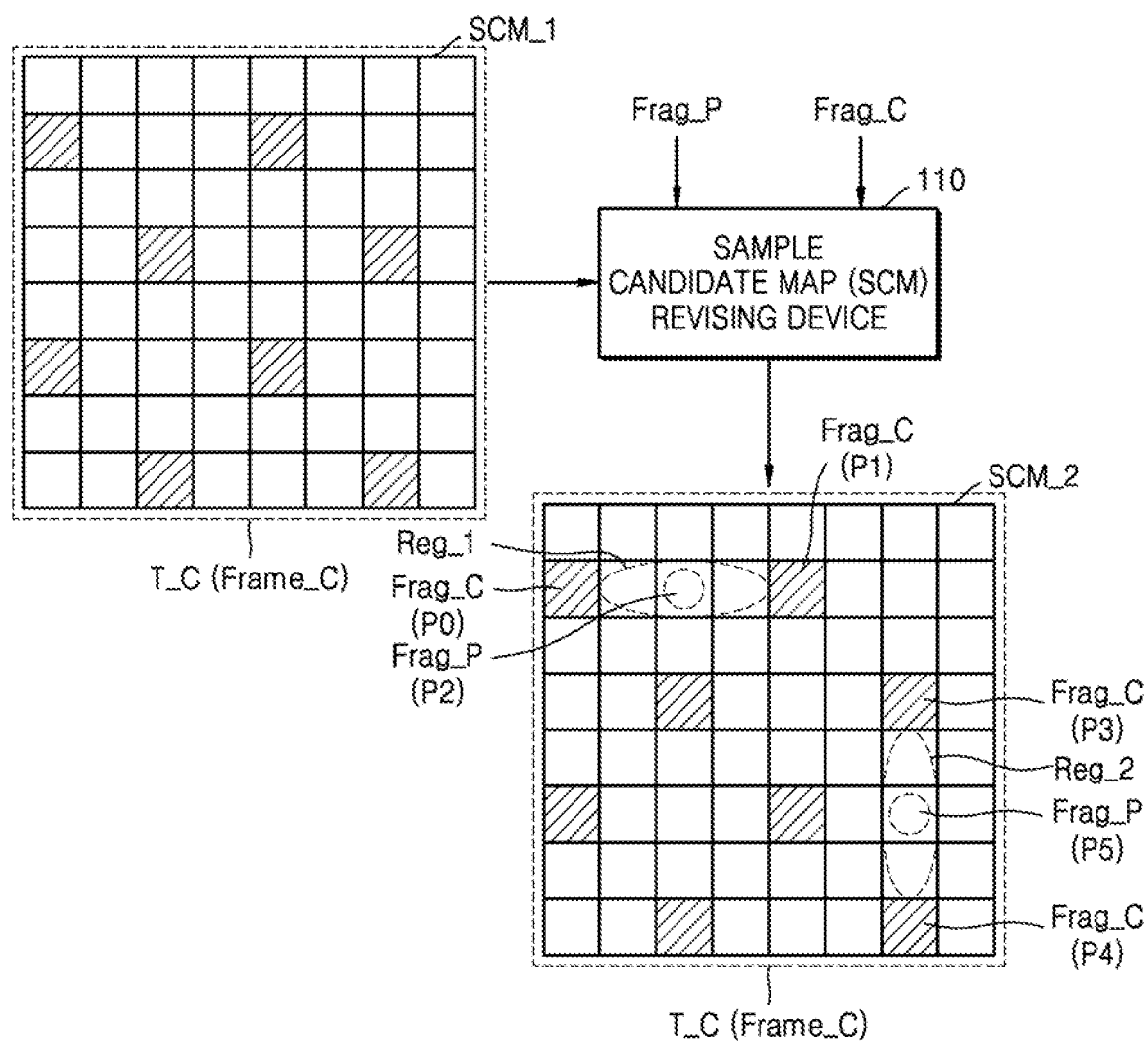
FIG. 2 is a diagram illustrating a concept of a sample candidate map revising operation according to the embodiment of FIG. 1.

FIG. 2 is a diagram illustrating a concept of the sample candidate map revising operation according to the embodiment of FIG. 1. The first sample candidate map SCM_1 may include sampling information having a predetermined pattern. For example, as illustrated in FIG. 2, one fragment may be sampled for every four fragments in a horizontal direction with respect to a plurality of fragments. Sampling may be applied to one row for every two rows in a vertical direction, and the sampling positions from sampled row to sampled row may be staggered. The first sample candidate map SCM_1 of FIG. 2 may be described as having a pattern of sampling two fragments for each 4*4 size. FIG. 2 also illustrates that at least a portion of the sample candidate map SCM_1 can be correlated with and applied to a batch of pixels T_C (Frame_C) of the current frame, such as a tile. At least a portion of the second sample candidate map SCM_2 can also be correlated with the same batch of pixels T_C (Frame_C). Thus, each shaded and unshaded square of the sample candidate map SCM_1 may be envisioned as overlaying a respective pixel of the pixel batch T_C (Frame_C).

The SCM revising device 110 may generate the second sample candidate map SCM_2 by revising the sampling information of the first sample candidate map SCM_1. Also, according to the above example, the SCM revising device 110 may receive the fragment value Frag_C calculated through the shading processing in the current frame and the fragment value Frag_P calculated through the shading processing in the previous frame.

The SCM revising device 110 may perform an operation based on the fragment values Frag_C and Frag_P and determine the necessity of shading processing on the other fragments based thereon. As an example, a description will be given below with reference to a fragment at a first position P0, a fragment at a second position P1, and a fragment at a third position P2 in the horizontal direction.

The fragment value Frag_C (P0) of the fragment at the first position P0 and the fragment value Frag_C (P1) of the fragment at the second position P1 may be calculated through the fragment shading processing based on the first sample candidate map SCM_1 with respect to the current frame and then provided to the SCM revising device 110. (The legend Frag_C may be understood to represent a set of fragment values at the different positions P0, P1, etc; and likewise for the legend Frag_P.) Also, in the previous frame, shading processing may have been performed on the fragments at different positions due to the dithering technique, and as a static frame-to-frame condition example, the fragment value Frag_P of the third position P2 of the previous frame may be provided to the SCM revising device 110. According to an embodiment, the position of fragments sampled through the first sample candidate map SCM_1 may vary from frame to frame based on dithering, and thus the position of fragments intermediate-rendering-processed in the previous frame and the position of fragments intermediate-rendering-processed in the current frame may differ from each other. Moreover, even if motion of objects is significant between frames, fragment values computed for the previous frame may be mapped to corresponding positions of the current frame such that the previous frame fragment values may still be useful in revising the sample candidate map.

The SCM revising device 110 may perform a sample candidate map revising operation by using the values of fragments of the first to third positions P0 to P2. For example, the fragment value Frag_C of the first position P0 and the fragment value Frag_P of the third position P2 may be compared, and also the fragment value Frag_C of the second position P1 and the fragment value Frag_P of the third position P2 may be compared. The sample candidate map may be revised such that the fragments between the first position P0 and the second position P1 may be sampled according to the comparison results.

As an example, the sample candidate map may be revised based on the comparison result between the fragment value Frag_C of the first position P0 and the fragment value Frag_P of the third position P2 and/or the comparison result between the fragment value Frag_C of the second position P1 and the fragment value Frag_P of the third position P2. When the difference between the fragment values Frag_C and Frag_P is above a predefined threshold, an image change may be large and/or an edge may exist. In this case, the sample candidate map may be revised such that the fragments in a region Reg_1 between the first position P0 and the second position P1 may be sampled. (Note that the fragment value Frag_P (P2) may be used for the fragment of the current frame at the position P2 based on advection, such that sampling may be avoided in the current frame for the fragment at position P2.) On the other hand, when the differences between the fragment values Frag_C (P0) and Frag_P (P2) and between Frag_C (P1) and Frag_C (P2) are each below the threshold, the image change may be small and sampling may be avoided for all the fragments therebetween in the region Reg_1. For example, based on the fragment values Frag_C and Frag_P of the current frame and the previous frame, the values of the fragments in the region Reg_1 may be calculated by shading processing or interpolation processing (with advection processing optionally used for position P2 as previously discussed).

Meanwhile, in FIG. 2, by using the fragment values Frag_C, of a fourth position P3 and a fifth position P4 of the current frame and the fragment value Frag_P of a sixth position P5 of the previous frame, it may be determined whether to additionally sample the fragments in a region Reg_2. In a similar manner, it may be determined whether to perform additional sampling on all fragments of FIG. 2.

In the above embodiment, the fragments to be additionally sampled may be selected by various criteria. As an example, an edge detection algorithm based on the fragment values Frag_C and Frag_P may be performed, and the sample candidate map may be revised according to the edge detection result thereof.

Meanwhile, in the example illustrated in FIG. 2, the sampling information of the fragments between the first position P0 and the second position P1 may be revised together in an embodiment, or may be revised separately in an alternative embodiment. For example, based on the fragment values Frag_C (P0) and Frag_P (P2), the sampling information of the fragment between the first position P0 and the third position P2 may or may not be revised. However, the sampling information of the fragment between the second position P1 and the third position P2 may be changed independently.

Figure 3:
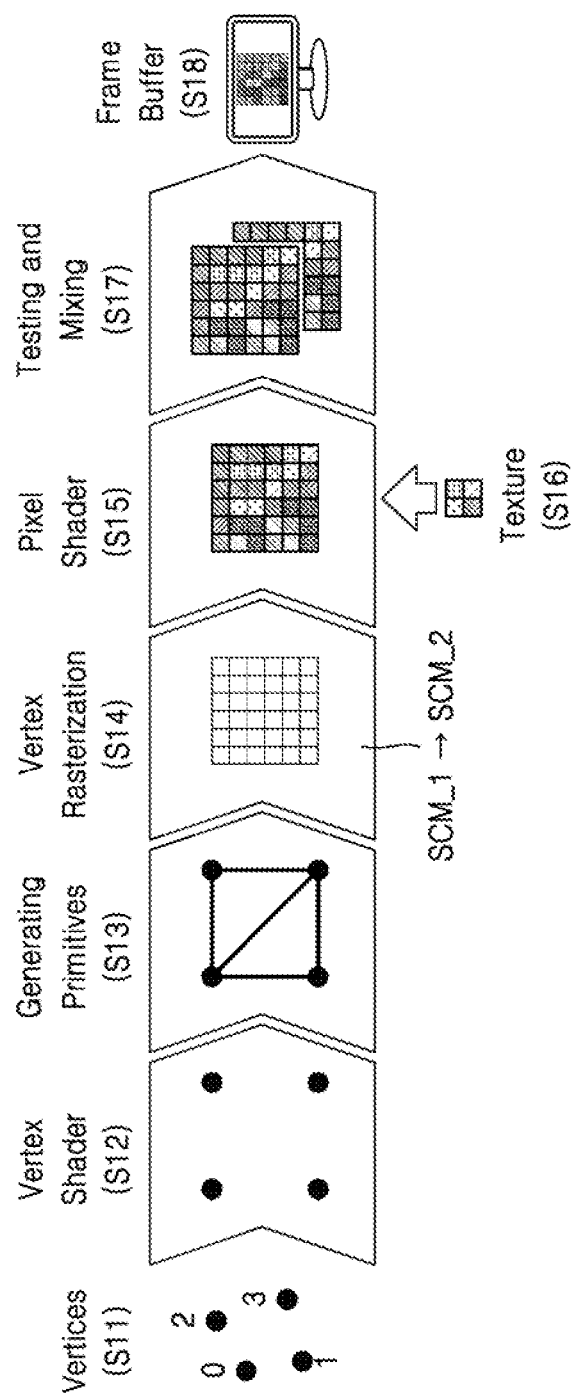
FIG. 3 is a diagram illustrating a process of processing three-dimensional (3D) graphics in a graphic processor.

FIG. 3 is a diagram illustrating a process of processing 3D graphics in a graphic processor. The process of processing 3D graphics may include a geometric conversion processing process, a rasterization process, and a pixel shading processing process.

In a system, an application program may provide a series of commands describing a rendering method, together with data to be rendered, to a graphic processor through a device driver. The graphic processor may receive and interpret the commands and perform actual rendering through fixed hardware or programmable hardware. A rendering process may include various processing operations.

First, operation S11 may be an operation of generating vertices. The vertices may be generated to represent objects included in the 3D graphics. Also, operation S12 may be an operation of shading the generated vertices, and shading on the vertices may be performed by designating the positions of the vertices generated in operation S11. Also, operation S13 may be an operation of generating primitives, and the primitive may be a point, a line, or a polygon formed by using at least one vertex. As an example, the primitive may be represented by a triangle formed by connecting vertices.

Operation S14 may be an operation of performing rasterization on the generated primitive, and rasterizing the primitive may mean dividing the primitive into fragments. A fragment is a basic unit for performing graphic processing on the primitive. Since the primitive includes only information about the associated vertex(es), graphic processing on the 3D graphics may be performed by generating fragments between vertices in the rasterization operation, where the fragments are projected to a 2D plane corresponding to a pixel grid to facilitate a corresponding display of the 2D image on a flat display screen composed of pixels.

Operation S15 may be an operation of shading the fragments. The fragments constituting the primitive may correspond to pixels constituting a tile. The color of a pixel may be determined in pixel shading.

Operation S16 may be a texturing operation for determining the color of a pixel. Texturing may be a process of determining the color of a pixel by using a texture, which is a prepared image. Since calculating and determining the color of each pixel to represent various colors and pattern shapes of the real world may increase the graphic processing time and the data operation amount required for graphic processing, the color of a pixel may be determined by using a prepared texture. For example, the color of a pixel may be determined by storing the surface color of an object as a separate 2D image referred to as a texture and enlarging and reducing the stored texture according to the position and size of the object on a screen or mixing texel values by using textures having various resolutions.

Operation S17 may be a testing and mixing operation. Through a process such as a depth test, with respect to pixels corresponding to the same position in a tile, pixel values corresponding to one tile may be determined by determining a pixel value to be finally displayed. A plurality of tiles generated through the above process may be mixed to generate 3D graphics corresponding to one frame. Operation S18 may be an operation of storing the frame generated through operations S11 to S17 in a frame buffer and displaying the frame stored in the frame buffer through a display device.

A sample candidate map revising operation according to embodiments of the inventive concept may be performed in the graphics processing process of FIG. 3. According to an embodiment, in the rasterization operation (S14), a sample candidate map generating and revising operation may be performed to select a fragment to be shading-processed. For example, in the rasterization operation (S14), a first sample candidate map SCM_1 may be generated according to a pattern varying from frame to frame; a sample candidate map revising operation may be performed by using the fragment value of the current frame and the fragment value of the previous frame according to the above embodiments; and a fragment sampled by a second sample candidate map SCM_2 may be provided to a device (hardware or processing core) that performs shading processing.

FIG. 4 is a block diagram illustrating an implementation example of a graphic processor according to an example embodiment of the inventive concept. As an example, a graphic processor 200 of FIG. 4 may correspond to a GPU.

Referring to FIG. 4, the graphic processor 200 may include a rasterizer 210, a shader core 220, a texture processing unit 230, a pixel processing unit 240, and a tile buffer 250. The graphic processor 200 may exchange data with an external memory 201 through a bus. In addition, the graphic processor 200 may further include various other components (not shown) for processing 3D graphics.

As an example, the graphic processor 200 may use a tile-based rendering (TBR) method. To generate 3D graphics corresponding to one frame, the graphic processor 200 may pass a plurality of tiles divided into predetermined sizes through the rasterizer 210, the shader core 220, and the pixel processing unit 240 and store the processing results in the tile buffer 250. The graphic processor 200 may perform parallel processing on all tiles constituting a frame by using a plurality of pipelines constructed by the rasterizer 210, the shader core 220, and the pixel processing unit 240. When a plurality of tiles corresponding to one frame are processed, the graphic processor 200 may transmit the processing results stored in the tile buffer 250 to a frame buffer (not illustrated) of the memory 201.

The rasterizer 210 may perform rasterization on a primitive generated through the above geometric conversion process. Also, the shader core 220 may receive the rasterized primitive from the rasterizer 210 and perform the above pixel shading (or fragment shading) processing on the pixels (or fragments) constituting a tile. Also, in a pixel shading process, the shader core 220 may use the pixel value generated by using a texture in order to generate stereoscopic and realistic 3D graphics.

Meanwhile, the shader core 220 may further perform vertex shading processing together with the above pixel shading processing. As an example, when the shader core 220 performs vertex shading processing, a primitive representing an object may be generated and output to the rasterizer 210.

Also, the shader core 220 may request the texture processing unit 230 to output a pixel value corresponding to a pixel, and the texture processing unit 230 may output a pixel value generated by processing a prepared texture. The texture may be stored in a predetermined space inside or outside the texture processing unit 230 or in the memory 201 outside the graphic processor 200. When the texture used to generate the pixel value requested by the shader core 220 is not in a predetermined space inside the texture processing unit 230, the texture processing unit 130 may fetch and use the texture from the memory 201 or a space outside the texture processing unit 230.

Through a process such as a depth test, with respect to pixels corresponding to the same position in one tile, the pixel processing unit 240 may determine all pixel values corresponding to one tile by determining a pixel value to be finally displayed. The tile buffer 250 may store all the pixel values corresponding to one tile received from the pixel processing unit 240. When a graphic processing process on all tiles constituting one frame is completed, the processing results stored in the tile buffer 250 may be transmitted to the frame buffer of the memory 201.

In the above embodiment, an SCM revising device 211 may be included in the rasterizer 210. As an example, the rasterizer 210 may generate a first sample candidate map by receiving predetermined pattern information and may also generate a second sample candidate map through the revising operation according to the above embodiment. Also, the rasterizer 210 may receive a fragment value Frag_P of a previous frame stored in the memory 201 and perform a revising operation based thereon. The rasterizer 210 may selectively provide sampled fragments among a plurality of fragments to the shader core 220. According to an embodiment, the rasterizer 210 may include a plurality of hardware units (e.g., processing cores), and a first sample candidate map generating operation and a second sample candidate map generating operation may be performed by the same hardware or by different hardware units.

Meanwhile, the shader core 220 may perform the intermediate rendering processing and the final rendering processing in the above embodiment. According to an embodiment, the shader core 220 may include a plurality of hardware units (e.g., processing cores), and the intermediate rendering processing and the final rendering processing may be performed by the same hardware or by different hardware units.

Hereinafter, particular examples of the sampling and shading processing according to embodiments of the inventive concept will be described.

Figure 5A:
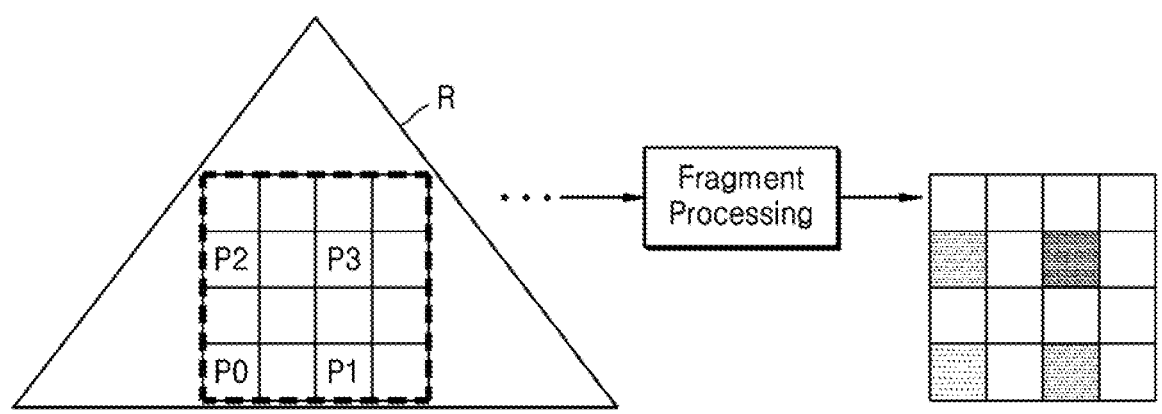
FIGS. 5A, 5B, and 5C are diagrams illustrating an example of shading processing on fragments in a primitive.
Figure 5B:
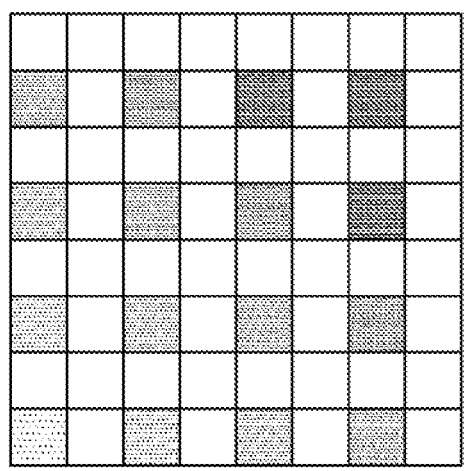
Figure 5C:
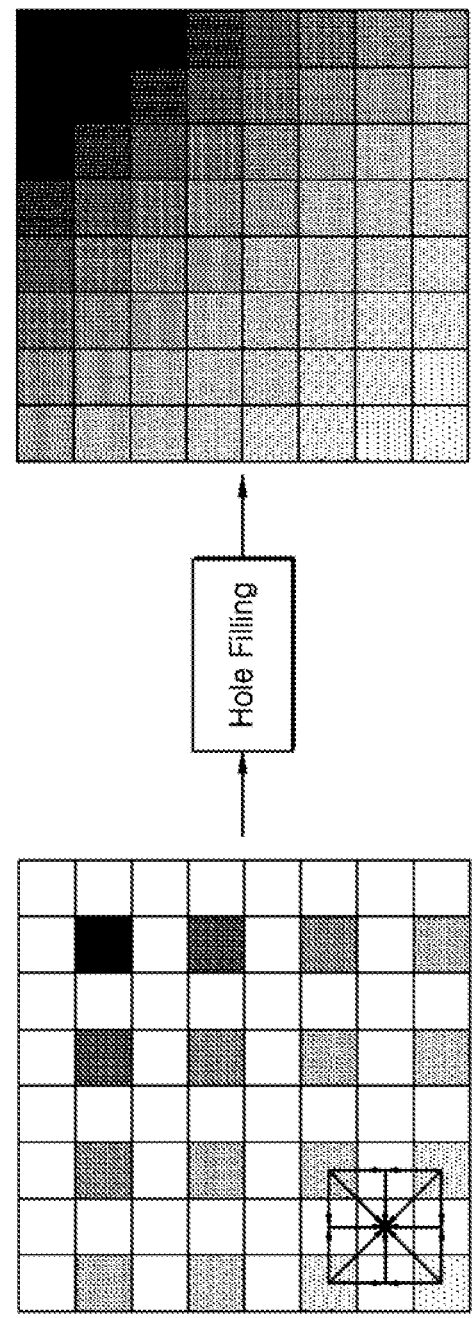

FIGS. 5A, 5B, and 5C are diagrams collectively illustrating an example of shading processing fragments of a primitive. FIGS. 5A, 5B, and 5C illustrate an example in which a candidate map revising operation is not performed.

FIG. 5A illustrates fragments of a 4*4 size as some fragments of any one primitive R, where sampling may be performed on the fragments of a primitive according to a predetermined sampling rate. As an example, FIG. 5A illustrates sampling performed according to a relatively fine pattern, in which one fragment is sampled for every two fragments in the horizontal and vertical directions. Fragments at positions P0 to P3 may be sampled according to a first sampling candidate map having a fine pattern, and shading processing may be performed on the sampled fragments. FIG. 5B illustrates the positions of shading-processed fragments among fragments of an 8*8 size when shading processing is performed on a larger batch of fragments such as a tile based on the sampling illustrated in FIG. 5A.

Referring to FIG. 5C, the values of fragments on which shading processing is not performed may be calculated through interpolation. For example, the value of a fragment at one position may be calculated through interpolation based on the values of one or more fragments adjacent thereto. For instance, the value of a fragment on which shading processing is not performed (an unsampled fragment) may be filled with a similar value with reference to the value of a fragment adjacent thereto, and the above interpolation processing may be referred to as hole filling. For instance, as shown in FIG. 5C, the value of an unsampled fragment with coordinates in a row of unsampled fragments and a column of unsampled fragments may be based on an average of four proximately located sampled fragments.

Figure 6:
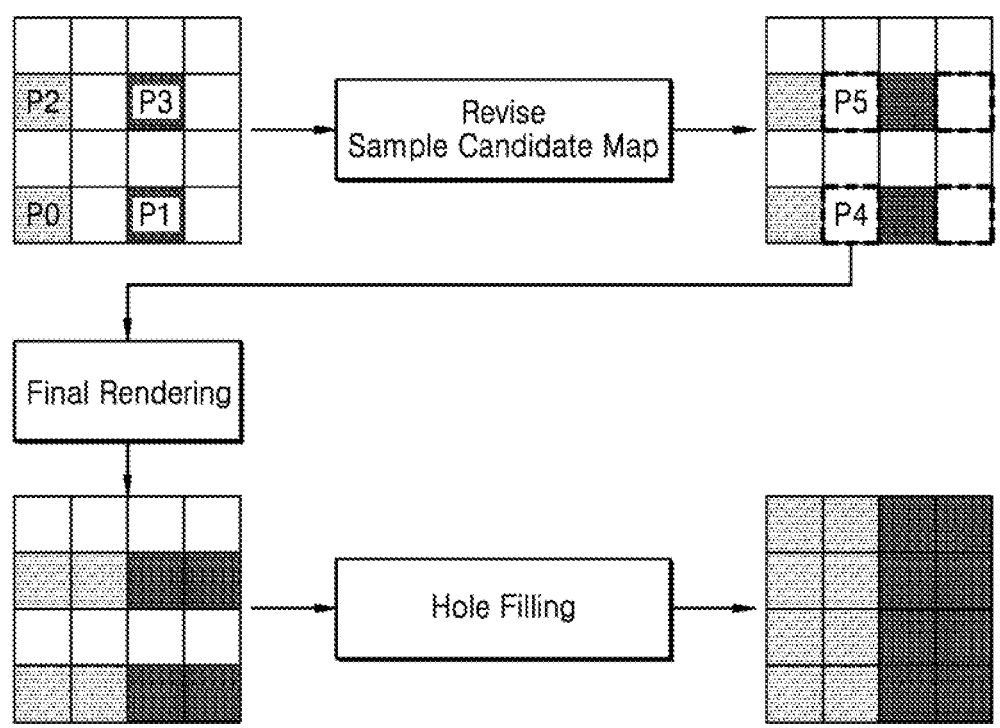
FIG. 6 is a diagram illustrating an example in which a sample candidate map revising operation is applied to the embodiment of FIGS. 5A, 5B, and 5C.

FIG. 6 is a diagram illustrating an example in which a sample candidate map revising operation is applied to the embodiment of FIGS. 5A, 5B, and 5C. FIG. 6 illustrates an example of revising a sample candidate map by using only data of a current frame without using a rendering result of a previous frame.

As shown in FIG. 6, fragments may be sampled at a predetermined rate according to a first sampling candidate map, and the values of the sampled fragments may be calculated through intermediate shading processing. Also, with respect to the other unsampled fragments, through a sampling candidate map revising operation, fragments to be additionally sampled may be selected.

The sampling candidate map revising operation may be performed by using the values of fragments calculated through the intermediate rendering processing of the current frame, and for example, it may be determined whether to additionally sample the fragment of the fifth position P4 based on the difference between the fragment value of the first position P0 and the fragment value of the second position P1. (If this difference is above a predefined threshold indicating an object edge or the like in between the positions, it may be determined to additionally sample the fragment in position P4, but not to sample the fragment at position P4 if the difference is below the threshold.) Similarly, it may be determined whether to additionally sample the fragment of the sixth position P5 based on the difference between the fragment value of the third position P2 and the fragment value of the fourth position P3. FIG. 6 illustrates a case where all of the fragments of a second row and a fourth row are sampled in the fragments of a 4*4 size according to the above method, and the values of the other fragments that are not shading-processed may be calculated through hole filling processing.

According to the embodiment illustrated in FIGS. 5A, 5B, and 5C, when there is no change or a gradual change in the values of fragments between proximate but non-contiguous sampled fragments in the map (such as between fragment positions P2 and P3 or P2 and P0), the value calculated by interpolation processing may be equal to or similar to an actual value. On the other hand, when there is a great change in the values of fragments between proximate sampled fragments, the validity of the results obtained through the interpolation processing may be unreliable. On the other hand, in the embodiment illustrated in FIG. 6, since hole filling is not performed immediately after the intermediate rendering processing but it may be determined once again through a sample candidate map revising process whether the unsampled fragments are suitable for interpolation processing, the quality of the rendering processing may be further improved in comparison with FIGS. 5A, 5B, and 5C.

FIGS. 7A and 7B illustrate an example of performing sample candidate map revision by using data of at least two frames. In FIGS. 7A and 7B, when data of two frames is used, the frames are classified into an odd frame Frame_Odd and an even frame Frame_Even, and a pattern of a first sample candidate map SCM_1 in each frame is illustrated. This is an example of providing a sample candidate map pattern that is dithered with a repetitive sequence between temporally successive frames. In other examples, such as that of FIG. 17A discussed later, a dithering pattern may span three or more frames. For instance, when data of three or more frames is used for candidate map revision, patterns of the first sample candidate map SCM_1 of the three or more frames may differ from each other. The sample candidate map dithering technique may reduce visual artifacts, particularly when there is slow or minimal motion of objects between frames.

Referring to FIG. 7A, the sampling rate of the first sample candidate map SCM_1 may be less than that of the embodiment of FIG. 6. As an example, in the example of FIG. 7A, only two fragments may be sampled per fragment of a 4*4 size. In the rendering processing of the odd frame Frame_Odd, since the sampling information of the first sample candidate map SCM_1 has a first pattern, fragments located in the second row and the third column and fragments located in the fourth row and the first column may be sampled among the fragments of a 4*4 size. On the other hand, in the rendering processing of the even frame Frame_Even, since the sampling information of the first sample candidate map SCM_1 has a second pattern, fragments located in the second row and the first column and fragments located in the fourth row and the third column may be sampled among the fragments of a 4*4 size. However, this is merely one example, and the patterns of the first sample candidate maps SCM_1 of the odd frame Frame_Odd and the even frame Frame_Even may be set according to various other methods. For instance, as in FIG. 7A, the first sample candidate map SCM_1 of the odd frame Frame_Odd and the first sample candidate frame SCM_1 of the even frame Frame_Even may be set such that the odd frame Frame_Odd and the even frame Frame_Even may complement each other.

Hereinafter, an operation example of the inventive concept will be described assuming that the current frame corresponds to an even frame Frame_Even. First, in the processing of the even frame Frame_Even, the intermediate rendering processing may be performed according to the first sample candidate map SCM_1 having the second pattern, and thus the values of the fragments at the positions corresponding to the second pattern may be calculated. Also, in revising the first sample candidate map SCM_1 by using the pre-calculated values of the fragments, the values of the fragments at the position corresponding to the first pattern in the previous odd frame Frame_Odd and the values of the fragments at the position corresponding to the second pattern calculated through the intermediate rendering processing of the current even frame Frame_Even may be used.

An example of combining a fragment value Pv of the odd frame Frame_Odd and a fragment value Pv of the even frame Frame_Even used in sample candidate map revision is illustrated in FIG. 7B. For instance, even when the distance between the fragment values Pv is relatively long due to a low sampling rate thereof with respect to one frame, when the fragment values Pv of two frames are used according to an example embodiment of the inventive concept are used, the distance between fragment values may be short. Accordingly, the fragments that may require actual shading processing for fragment value accuracy may be determined more accurately, and final rendering processing may be performed on the additionally, sampled fragments. It should also be noted that in FIG. 7B, the fragment values from the previous frame, e.g., the fragment values F_O PV of the odd frame when the current frame is the even frame, may be actually used for the fragments at the corresponding locations in the rendering of the current frame. However, if there is movement of objects between the previous frame and the current frame in the video to be rendered, the movement may be accounted for in mapping the fragment of the previous frame to the current frame. Even without accounting for motion, if the image of the previous frame differs significantly from the current frame due to a scene change or fast movement, the previous frame fragments may differ significantly from proximate fragments of the current frame, which may warrant a revision to the sample candidate map.

Figure 8:
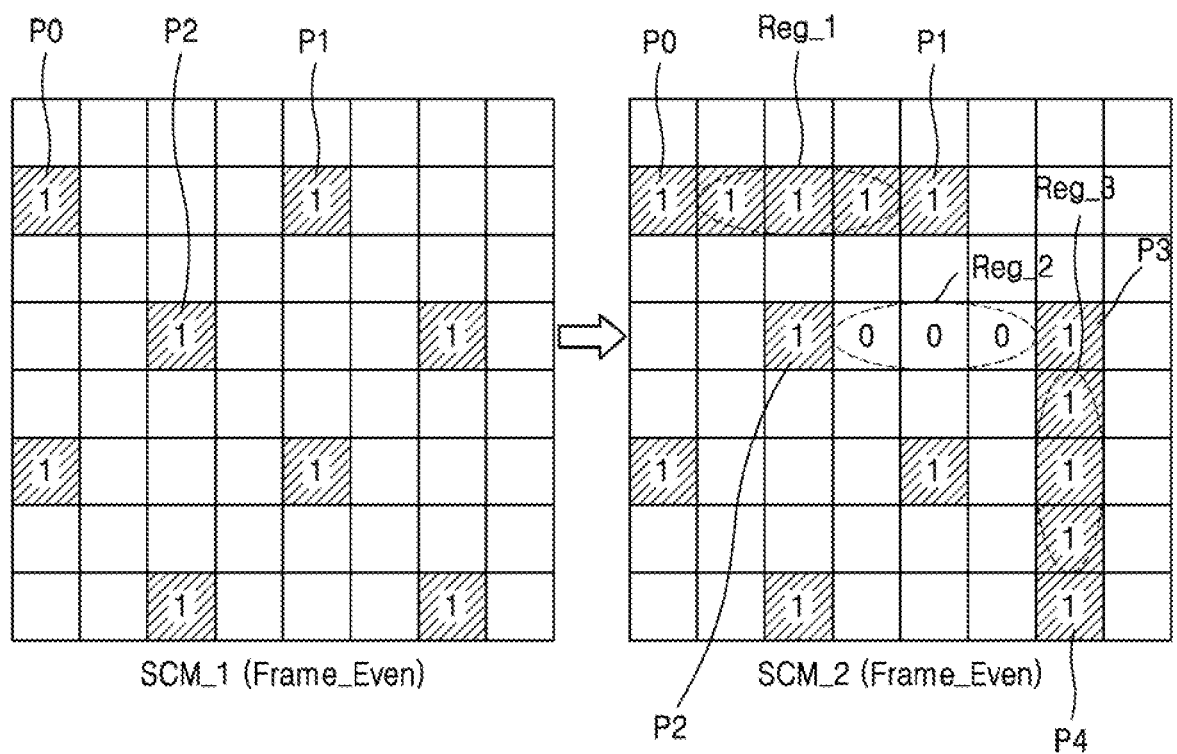

FIG. 8 is a diagram illustrating a first sample candidate map SCM_1 and a second sample candidate map SCM_2 as a revision thereof according to an example embodiment of the inventive concept. FIG. 8 illustrates a revision example of the sample candidate map in the even frame Frame_Even according to the embodiment of FIGS. 7A and 7B.

Referring to FIG. 8, a graphic processor may generate a first sample candidate map SCM_1 having a first pattern for intermediate rendering processing on fragments. As an example, a pattern corresponding to fragments to be sampled may have a value of "1", and a pattern corresponding to fragments that are not sampled may have a value of "0".

Thereafter, a second sample candidate map SCM_2 may be generated by re-evaluating the first sample candidate map SCM_1. As an example, the fragment value of a first position P0 and a second position P1 in a current frame and the fragment value in at least one previous frame therebetween may be used to determine whether to sample the fragments of a region Reg_1 between the first position P0 and the second position P1. FIG. 8 illustrates an example in which a pattern corresponding to the fragments of the region Reg_1 between the first position P0 and the second position P1 is changed and additionally sampled. Also, FIG. 8 illustrates an example in which the fragments of a region Reg_2 between a third position P2 and a fourth position P3 are not sampled, while the fragments of a region Reg_3 between the fourth position P3 and a fifth position P4 are additionally sampled.

According to the embodiment illustrated in FIGS. 7A, 7B, and 8, since the sample candidate map is revised by using the fragment values of at least two frames even when the sampling rate is small in comparison with the example of FIG. 6 described above, it may be possible to prevent a decrease in the determination accuracy of fragments requiring actual shading processing. For instance, according to the embodiment illustrated in FIGS. 7A, 7B, and 8, the processing speed and/or utilization of processing resources may be improved by reducing the number of fragments on which intermediate rendering processing is unnecessarily performed, while degradation of the rendering quality may be minimized.

Also, according to embodiments of the inventive concept, operations according to the embodiments of FIGS. 5A, 5B, and 5C to 8 described above may be selectively performed. As an example, the graphic processor may adjust the sampling rate of the first sample candidate map through the control from a host or through its own control, thereby adjusting the amount of fragments to be shading-processed. For example, some of a plurality of rendering-processed frames may be processed according to the example of FIGS. 5A, 5B, and 5C, some others may be processed according to the example of FIG. 6, and some others may be processed according to the example of FIGS. 7A, 7B, and 8. For example, in the sampling mode, the embodiment of FIG. 6 may be applied when the sampling rate of the first sample candidate map is greater than a predetermined reference value, and the embodiment of FIGS. 7A, 7B, and 8 may be applied when the sampling rate of the first sample candidate map is less than the predetermined reference value.

Alternatively, the graphic processor may set the on/off of the sampling mode through the control from the host or through its own control, and when the sampling mode is off, all the fragments in the frame (or tile or primitive) may be shading-processed.

Figure 9:
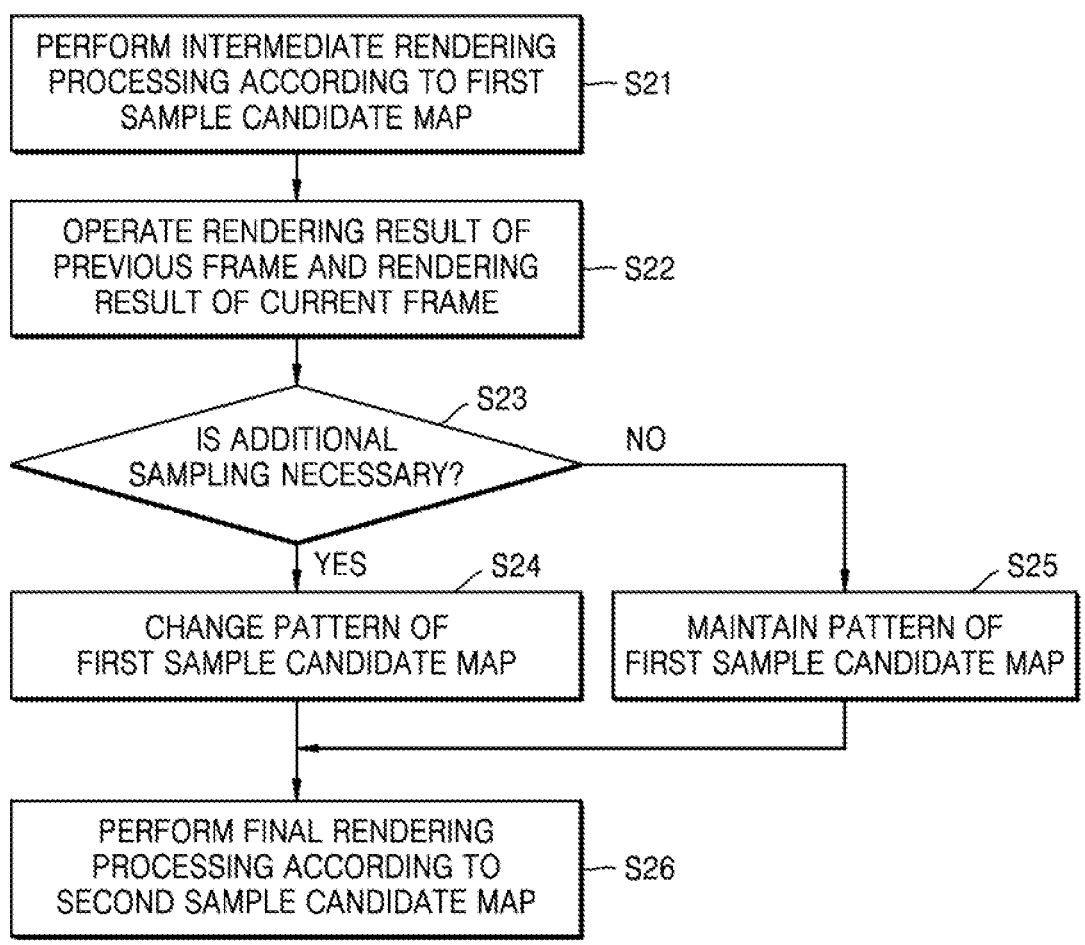
FIGS. 9 and 10 are flowcharts illustrating methods of operating a graphic processor, according to example embodiments of the inventive concept.
Figure 10:
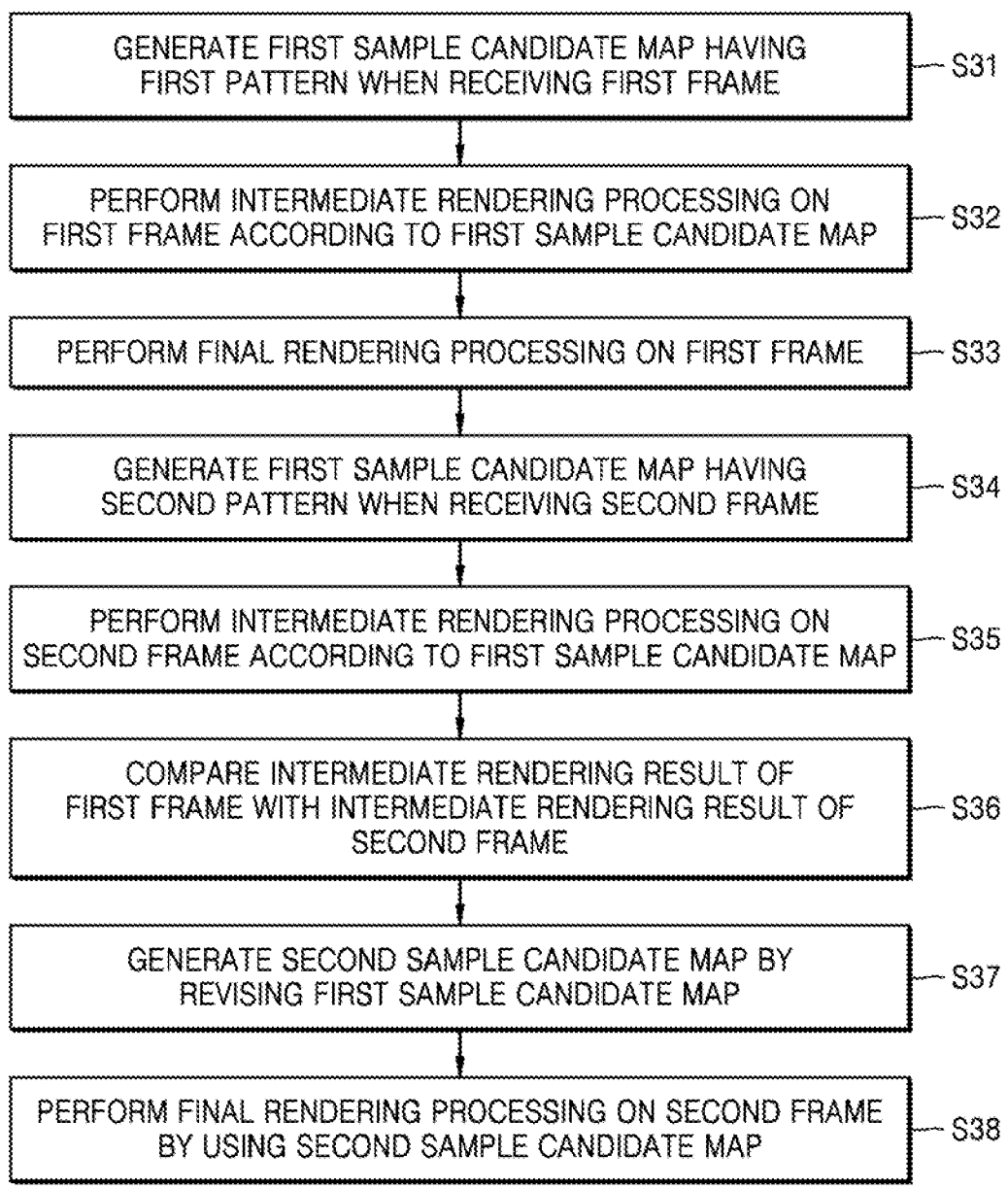

FIGS. 9 and 10 are flowcharts illustrating respective methods of operating a graphic processor according to example embodiments of the inventive concept.

Referring to FIG. 9, intermediate rendering processing may be performed by shading some of a plurality of fragments of a frame according to the first sample candidate map SCM_1 (S21). Thereafter, the rendering result of the previous frame (e.g., the intermediate rendering result) and the rendering result of the current frame may be operated to select a fragment to be additionally shaded (S22). Also, it may be determined whether additional sampling is necessary for each region including one or more fragments according to the operation result (S23).

As a result of the determination, the arrangement of a pattern corresponding to the fragment requiring additional sampling in the first sample candidate map SCM_1 may be changed (S24). On the other hand, the value of a pattern corresponding to the fragment not requiring additional sampling in the first sample candidate map SCM_1 may be maintained (S25). Also, final rendering processing may be performed by shading additional fragments according to the second sample candidate map SCM_2 generated through the above process (S26).

Referring to FIG. 10, a first sample candidate map SCM_1 having different patterns (in different operating modes or due to dithering patterns between frames) may be generated according to a frame input to the graphic processor, and a first sample candidate map SCM_1 having a first pattern may be generated when a first frame is received (S31). Intermediate rendering processing may be performed on some fragments by using the first sample candidate map SCM_1 having the first pattern (S32), and final rendering processing may be performed on the first frame through a final shading and interpolation operation (S33).

When a second frame is received, a first sample candidate map SCM_1 having a second pattern may be generated (S34) (for dithering). Also, intermediate rendering processing may be performed on some fragments by using the first sample candidate map SCM_1 having the second pattern with respect to the second frame (S35), and the intermediate rendering result of a fragment in the first frame and the intermediate rendering result of a proximate fragment in the second frame may be compared with each other (S36). Also, a second sample candidate map SCM_2 may be generated by changing the sampling information of the first sample candidate map SCM_1 based on the comparison result (S37), and final rendering processing may be performed by using the second sample candidate map SCM_2 (S38).

Figure 11:
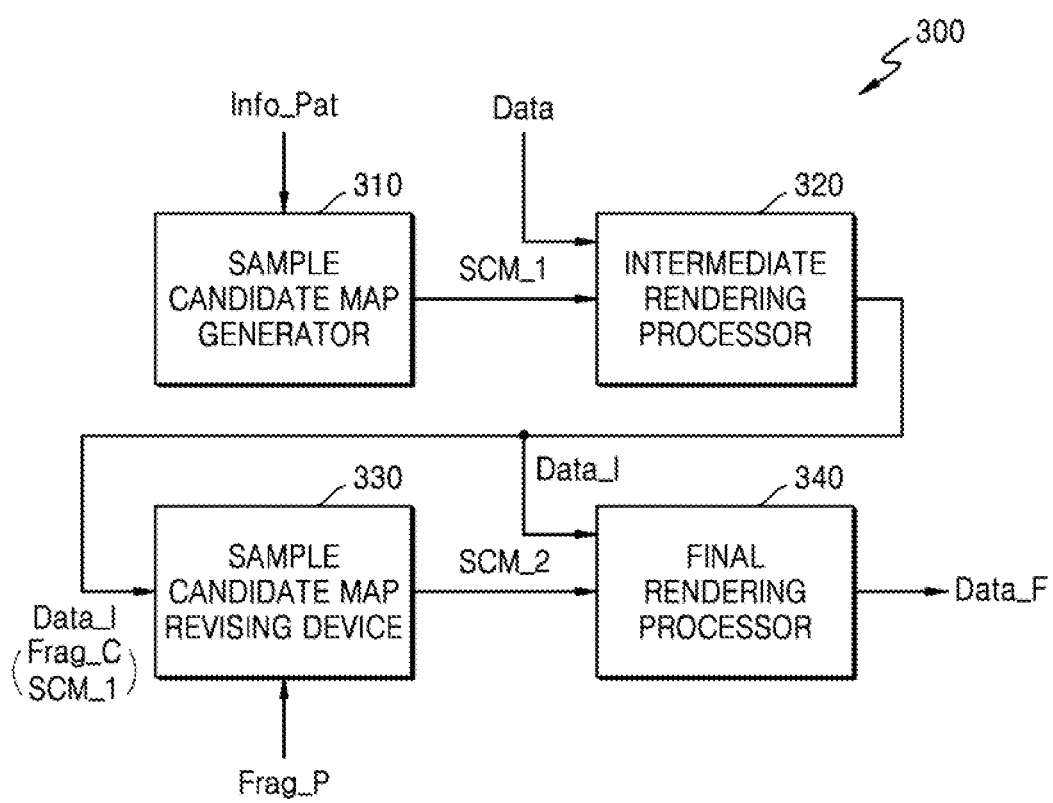
FIG. 11 is a block diagram illustrating an implementation example of a graphic processor according to example embodiments of the inventive concept.

FIG. 11 is a block diagram illustrating an implementation example of a graphic processor according to example embodiments of the inventive concept. In FIG. 11, only a configuration for performing sample candidate map generation and change and a configuration for processing rendering are illustrated for convenience of description; however, various other configurations for graphic processing may be further included in the graphic processor.

Referring to FIG. 11, a graphic processor 300 may include an SCM generator 310, an intermediate rendering processor 320, a SCM revising device 330, and a final rendering processor 340. According to an embodiment, the components illustrated in FIG. 11 may include hardware such as a processing core. Although the intermediate rendering processor 320 and the final rendering processor 340 are illustrated as separate hardware units in FIG. 11, intermediate rendering processing and final rendering processing may be performed by the same hardware according to other embodiments. The various elements 310, 320, 330, 340 may be part of an integrated circuit.

The SCM generator 310 may receive the pattern information Info_Par and generate a first sample candidate map SCM_1 by using the pattern information Info_Pat. The pattern information Info_Pat may include information representing the positions of fragments among a plurality of fragments to be intermediate-rendering-processed. The pattern information Info_Pat may be provided from a host to the graphic processor 300. Alternatively, the graphic processor 300 may store various pattern information therein, and pattern information Info_Pat may be generated in the graphic processor 300 according to a command from the host. Alternatively, as another embodiment, the graphic processor 300 may determine the order of frames to be currently rendered and generate pattern information Info_Pat having different patterns according to the frames (e.g. based on a dithering scheme as described above).

The intermediate rendering processor 320 may receive data of a plurality of fragments and a first sample candidate map SCM_1 and selectively perform shading processing on the fragments corresponding to a first pattern of the first sample candidate map SCM_. The shading processing result Data_I of the intermediate rendering processor 320 may be provided to the SCM revising device 330, and the shading processing result Data_I from the intermediate rendering processor 320 may include fragment values of positions corresponding to the first pattern.

The SCM revising device 330 may further receive a fragment value Frag_P of a previous frame, and the fragment value Frag_P may include an intermediate rendering processing result based on a first sample candidate map SCM_1 having a second pattern in the previous frame. The SCM revising device 330 may generate a second sample candidate map SCM_2 by changing the first sample candidate map SCM_1 through an operation based on the fragment value Frag_P of the previous frame and the processing result from the intermediate rendering processor 320. The final rendering processor 340 may receive the second sample candidate map SCM_2 and the shading processing result Data_I of the intermediate rendering processor 320 and generate a final rendering result Data_F by shading-processing some of the fragments on which intermediate rendering processing is not performed.

When the above rasterizer selectively samples the fragments to be shading-processed, the SCM generator 310 and the SCM revising device 330 may be included in the rasterizer in the embodiment illustrated in FIG. 11. Alternatively, each of the intermediate rendering processor 320 and the final rendering processor 340 may be defined as including a configuration for performing a rasterizing function.

Figure 12:
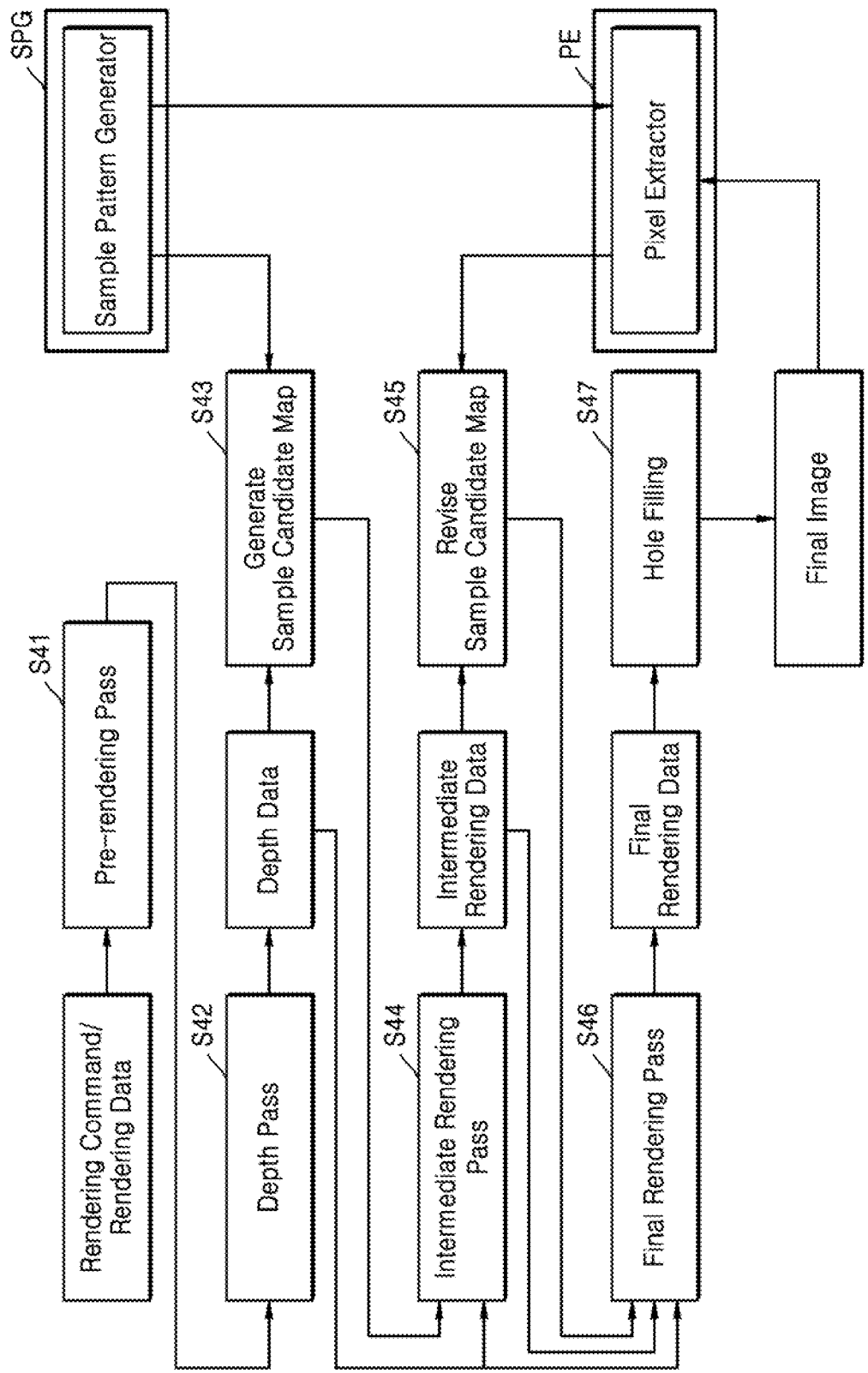
FIG. 12 is a diagram illustrating an overall operation procedure of a graphic processor to which an embodiment of the inventive concept is applied.

FIG. 12 is a diagram illustrating an overall operation procedure of a graphic processor to which an embodiment of the inventive concept is applied. The graphic processor may receive rendering data (or graphic data) and commands from a host through an application program, where the rendering data may include primitive information and/or texture information. The graphic processor may process the data and commands into a renderable form through a pre-rendering process (S41). Note that the pre-rendering process may be skipped according to the graphic processor, but when tile-based rendering is performed, tiling processing may be performed in the pre-rendering process.

Thereafter, a process of calculating a depth (S42) may be performed based on the result of the pre-rendering process, and depth data may be generated according to the calculation result. The depth calculating process may be skipped according to the application program or the graphic processor. When included, the depth data may be used to generate the first sample candidate map as discussed above according to an embodiment.

Sampling information having a predetermined pattern may be generated in the graphic processor or transmitted from the host and then provided to the SCM generator. As an implementation example, a sample pattern generator SPG may be provided in the graphic processor, where the sample pattern generator SPG may be capable of generating different pattern information. Referring to the examples described in the above embodiments, the sample pattern generator SPG may alternately provide the SCM generator with the pattern information having the first pattern and the pattern information having the second pattern according to the order of the frames. According to the order of the frames, the sample pattern generator SPG may provide one of the pattern information having the first pattern and the pattern information having the second pattern to the SCM generator and provide the other to a pixel extractor PE.

The SCM generator may generate the first sample candidate map such that fragments may be sampled according to the received sample pattern (S43), and may provide the generated first sample candidate map to the intermediate rendering processor. According to an embodiment, the SCM generator may generate the first sample candidate map by further using the depth data. For example, since the fragments having a great depth difference may have different values in the final rendering process or the probability of a great difference between the values may be high, the SCM generator may adjust the sampling information based on the depth data. For example, when the difference between the depths of a plurality of fragments included in a primitive is great, the first sample candidate map may be generated such that all of the plurality of fragments may be shading-processed. Alternatively, a plurality of fragments included in a primitive may be classified into a plurality of regions, and the first sample candidate map may be generated such that all the fragments included in the regions may be shading-processed based on the depth difference in each region.

Intermediate rendering processing may be performed by using the pre-rendering result, the depth data, and the first sample candidate map generated through the above process (S44). According to the first sample candidate map, the values of a plurality of fragments may be calculated by shading processing, while the other fragments may correspond to holes that are not shading-processed.

Meanwhile, according to embodiments of the inventive concept, a second sample candidate map may be generated by revising the first sample candidate map (S45). As an example, the SCM revising device may further receive the fragment value extracted from the previous frame while receiving the intermediate rendering processing result of the current frame. The pixel extractor PE illustrated in FIG. 12 may receive pattern information and fragment values of the previous frame, extract values of fragments corresponding to the pattern information, and provide the same to the SCM revising device. The SCM revising device may generate the second sample candidate map through the operation based on the fragment values of the previous frame and the current frame according to the above embodiments.

The final rendering processor 340 may perform the final rendering processing by using the intermediate rendering data, the depth data, and the second sample candidate map (S46). Through the final rendering processing, additional shading processing may be performed on the fragments. The data generated according to the final rendering processing may still include a hole, and a final image may be generated through hole filling processing (S47).

According to embodiments described above, a fragment value extracted from the previous frame may be used in the sample candidate map revising process, and an interpolation operation for the hole filling processing may be performed by using the fragment value shading-processed in the current frame. Also, the final image data of the current frame generated according to the above procedure may be used in a sample candidate map revising process in a rendering processing process of a next frame. In still another embodiment, processing of a future (next) frame may be performed prior to a current frame, such that fragment values computed in the future frame may be used for the same purpose as described above for the previous frame (e.g., in a reverse frame direction processing embodiment).

Figure 13:
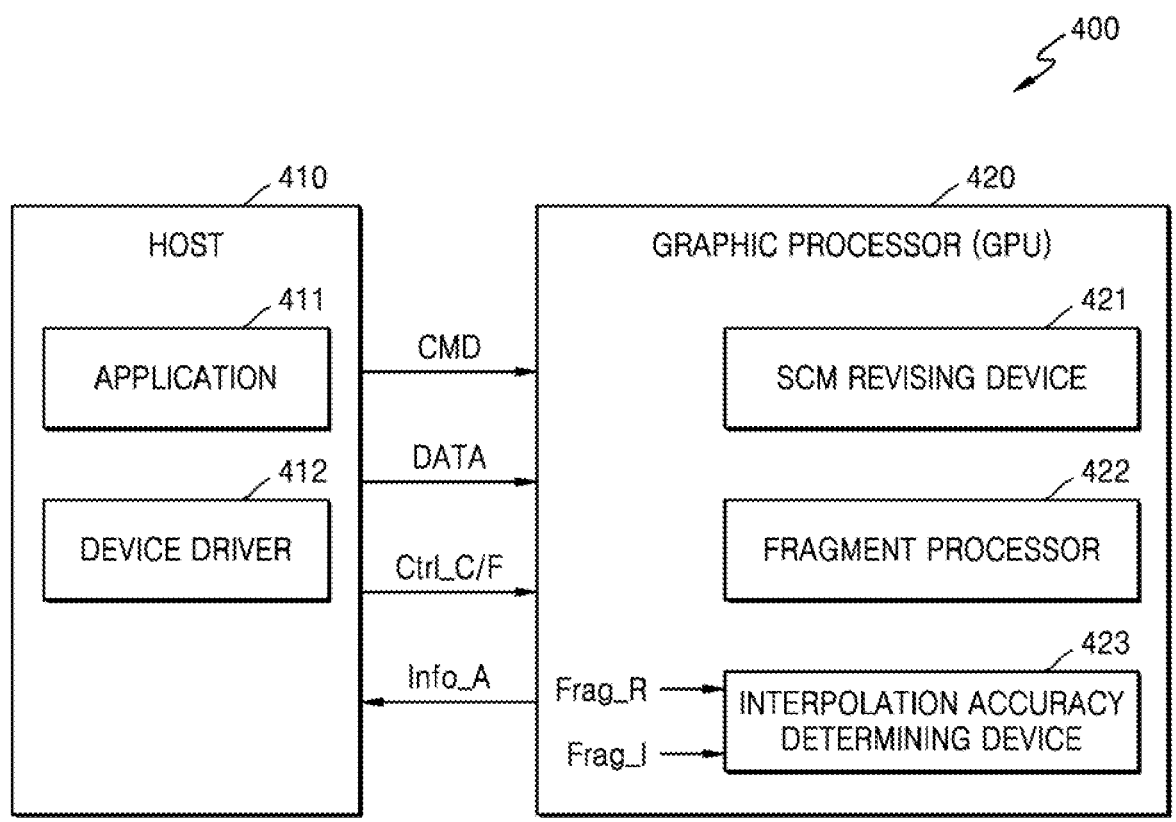
FIGS. 13, 14 and 15 are block diagrams illustrating respective rendering systems according to various embodiments of the inventive concept.

FIG. 13 is a block diagram illustrating a rendering system, 400, according to another embodiment of the inventive concept. Rendering system 400 may include a host 410 and a graphic processor 420. The host 410 may include an application 411 and a device driver 412. Also, the graphic processor 420 may include an SCM revising device 421, a fragment processor 422, and an interpolation accuracy determining device 423.

As an application program stored on a computer-readable medium, the application 411 may provide a command CMD and graphic data DATA to the graphic processor 420 through the device driver 412. Also, for example, the application 411 or the device driver 412 may control the sampling mode related to the rendering processing in the graphic processor 420 and may transmit a sampling control signal Ctrl_C/F to the graphic processor 420. The interpolation accuracy determining device 423 of the graphic processor 420 may determine the accuracy of fragment values generated by the interpolation processing and provide determination information Info_A to the host 410.

When the sampling control signal Ctrl_C/F indicates a sampling off mode, the graphic processor 420 may perform shading processing on all fragments without performing a sampling operation in the above embodiment. On the other hand, when the sampling control signal Ctrl_C/F indicates a sampling on mode, the graphic processor 420 may generate a sample candidate map having a predetermined pattern according to the above embodiments, revise the sample candidate map, and perform intermediate rendering processing and final rendering processing.

The interpolation accuracy determining device 423 may determine the interpolation accuracy according to a predetermined period. As an example, the interpolation accuracy may be determined for each frame or for a plurality of frames. In the latter case, interpolation accuracy may be sampled for every K frames, where K is a predetermined integer. The interpolation accuracy may be determined by various methods. As an example, with respect to the fragments of the same position, the interpolation accuracy may be determined by comparing the fragment value Frag_I generated by interpolation with the fragment value Frag_R generated by actual shading processing. When the difference between the fragment value Frag_I by the interpolation and the fragment value Frag_R by the shading processing is great, it may indicate that the value of a fragment needing to be shading-processed may be calculated by interpolation and the rendering processing characteristics may be low.

The determination information Info_A may include various information. As an example, the interpolation accuracy determining device 423 may perform comparison processing based on the fragment values Frag_R and Frag_I and calculate the interpolation accuracy based thereon to generate the determination information Info_A. Alternatively, as another embodiment, the determination information Info_A may include only the operation results based on the fragment values Frag_R and Frag_I, and the host 410 may use the determination information Info_A to determine the interpolation accuracy. The host 410 may generate the sampling control signal Ctrl_C/F based on the determination information Info_A.

Figure 14:
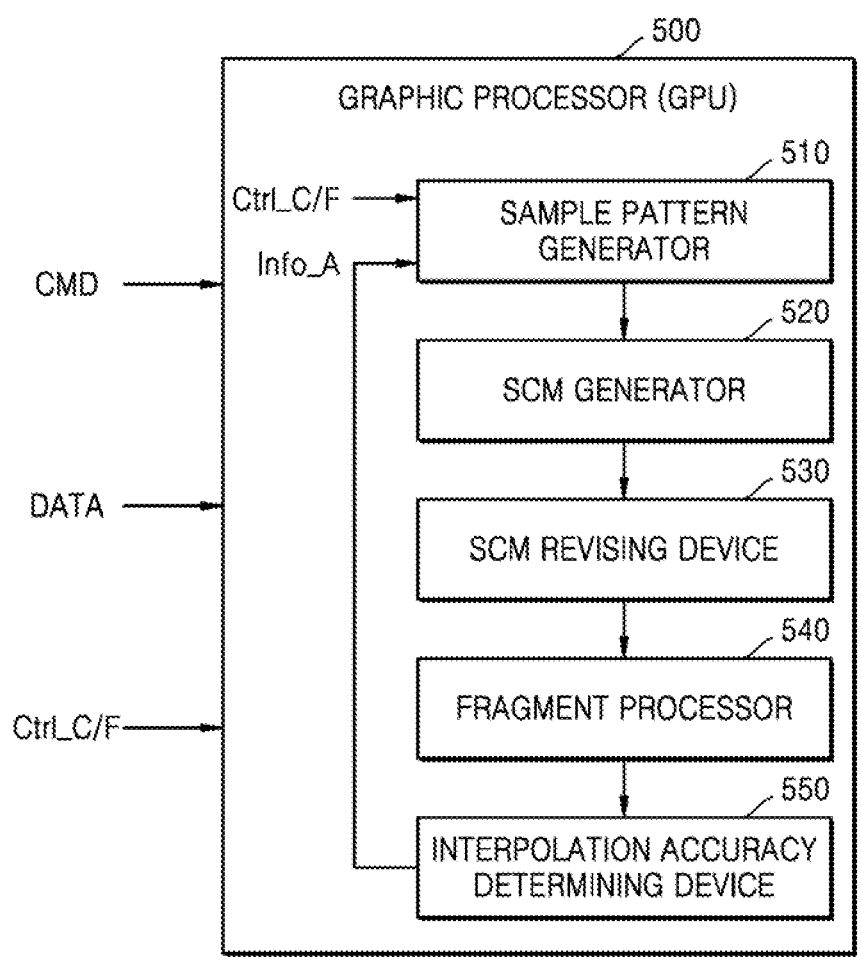

FIG. 14 is a block diagram illustrating a graphic processor according to another embodiment of the inventive concept, FIG. 14 illustrates an example in which a graphic processor 500 internally determines the interpolation accuracy and adjusts the sampling rate of the first sample candidate map based thereon.

Referring to FIG. 14, the graphic processor 500 may include a sample pattern generator 510, an SCM generator 520, an SCM revising device 530, a fragment processor 540, and an interpolation accuracy determining device 550. The sample pattern generator 510 may generate pattern information having a predetermined pattern and provide the same to the SCM generator 520, and the SCM generator 520 may generate the first sample candidate map based thereon. Also, the graphic processor 500 may receive a sampling control signal Ctrl_C/F for controlling the on/off of a sampling mode, together with a command CMD and graphic data DATA, from a host.

The sample pattern generator 510 may generate pattern information having a different pattern for each frame. According to an embodiment, the sample pattern generator 510 may generate pattern information having a sampling rate adjusted based on the determination information Info_A from the interpolation accuracy determining device. For example, when the interpolation accuracy is relatively high (or greater than a predetermined value), it may be determined that the similarity for each frame is high and thus the sample pattern generator 510 may generate pattern information with a reduced sampling rate. On the other hand, when the interpolation accuracy is relatively low, the sample pattern generator 510 may generate pattern information with a relatively high sampling rate.

According to an embodiment, when the sampling rate is low, the sample candidate map revising operation may be performed by using the fragment values of a plurality of frames. On the other hand, when the sampling rate is high, the hole filling processing may be performed through interpolation without performing the sample candidate map revising operation or the final rendering processing may be performed through the sample candidate map revising operation based on the fragment value of the current frame.

Figure 15:
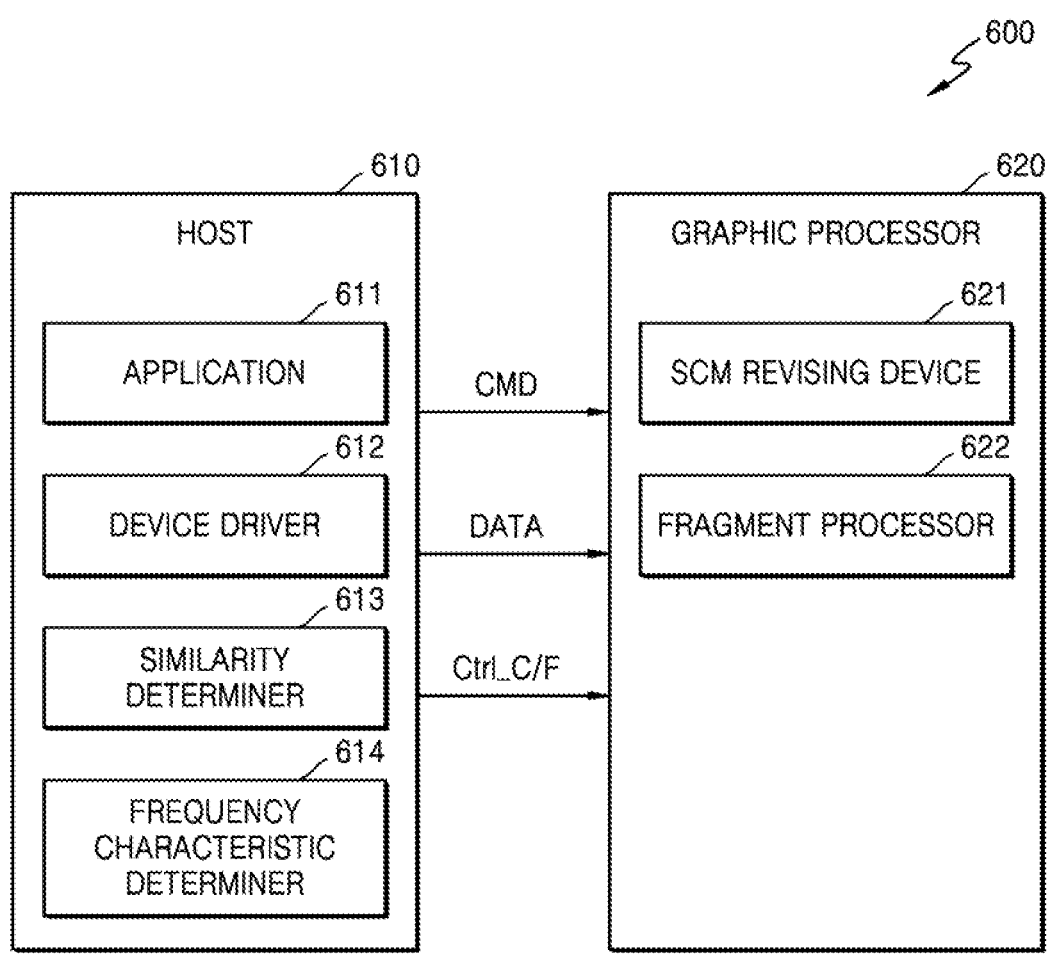

FIG. 15 is a block diagram illustrating a rendering system, 600, according to another embodiment of the inventive concept. Rendering system 600 may include a host 610 and a graphic processor 620, and the host 610 may include an application 611, a device driver 612, a similarity determiner 613, and a frequency characteristic determiner 614. Graphic processor 620 may include are SCM revising device 621 and a fragment processor 622.

According to an embodiment, the host 610 may determine the characteristics of frames to be output and control a sampling operation of the graphic processor 620 based thereon. As an example, the similarity determiner 613 may determine the similarity between a plurality of frames to be graphically processed, and the host 610 may provide a sampling control signal Ctrl_C/F to the graphic processor 620 based on the similarity determination. The sampling control signal Ctrl_C/F may control the on or off of the sampling mode, and according to an embodiment, the sampling control signal Ctrl_C/F may further include information for adjusting the sampling rate. As an example, a threshold criterion for the degree of similarity between a plurality of frames may be preset and stored in the host 610, and the similarity determiner 613 may determine, based on the preset information, whether the frame to be currently rendering-processed has a high similarity with respect to the previous frames. For instance, the threshold criterion may be based on motion vectors between a sequence of frames. If there is a small amount of motion, similarity may be deemed high, but if motion is fast, similarity may be deemed low.

The frequency characteristic determiner 614 may determine the characteristic of the frame. As an example, the frequency characteristic determiner 614 may determine the characteristic (e.g., the edge distribution degree) of a current or previous rendering-processed frame. When there are many edges in the current or previous frame, there is a high probability of existence of many edges in subsequent frames. In this case, the host 610 may provide the sampling control signal Ctrl_C/F to the graphic processor 620 to turn off the sampling mode or to increase the sampling rate.

Figure 16:
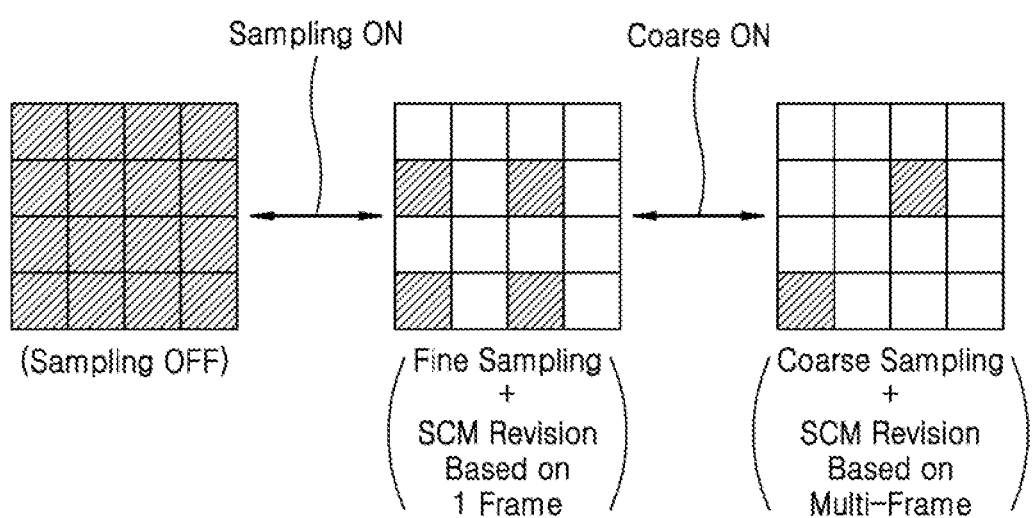
FIG. 16 is a diagram illustrating an example of a variable operation of a sampling mode.

FIG. 16 is a diagram illustrating an example of a variable operation of a sampling mode. In this example, a graphic processor may operate in various sampling modes, and the sampling mode may vary in performing the rendering processing on a plurality of frames. The change of the sampling mode may be controlled by the host or may be performed by the graphic processor itself. Alternatively, as another example, the on/off of the sampling mode may be controlled by the host, while the sampling rate in the sampling mode may be adjusted by the graphic processor itself.

When the content of the frame changes greatly or there are many edges in the frame, or when differences between interpolation-processed fragment values and actual shading-processed fragment values are high (e.g. on average above a threshold), the graphic processor may operate in a sampling off mode (or a full-sampling mode). In this case, shading processing may be performed on all the fragments.

Thereafter, the sampling mode may be turned on according to various criteria such as an increase in the similarity between the frames, and the graphic processor may first operate in a fine sampling mode. According to an embodiment, some fragments may be intermediate-shading-processed through a first sample candidate map having a great sampling rate, and the sample candidate map revising operation according to the above embodiment may be performed on the other fragments. Also, in the fine sampling mode, the sample candidate map revising operation may be performed by using the fragment value of the currently rendering-processed frame.

Also, the sampling mode may change into a coarse sampling mode. In this case, some fragments may be intermediate-shading-processed through the first sample candidate map having a small sampling ratio, and the sample candidate revising operation according to the above embodiment may be performed on the other fragments. Also, according to the above embodiment, in the coarse sampling mode, the sample candidate map revising operation may be performed by using the fragment value according to the shading processing of the current frame and the previous frame.

Figure 17A:
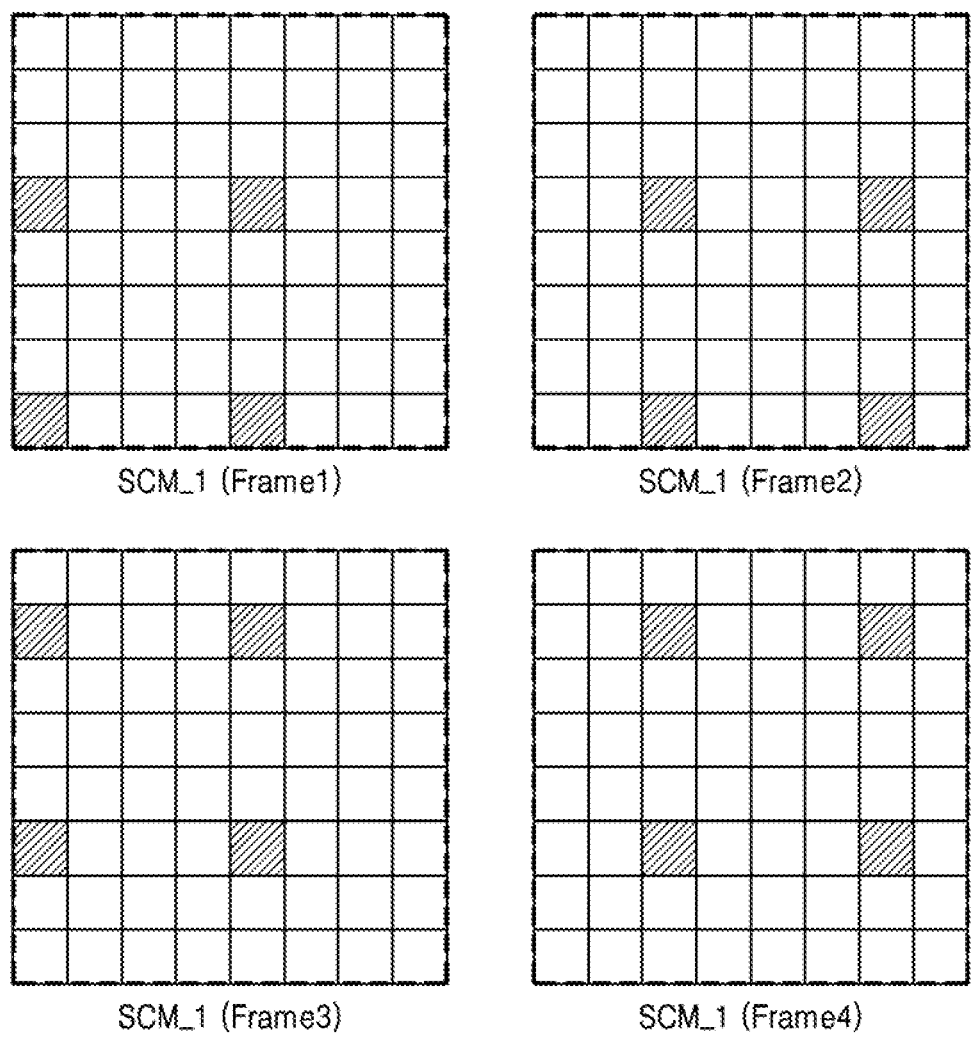
FIG. 17A shows different sample candidate maps across four frames according to a dithering technique.
Figure 17B:
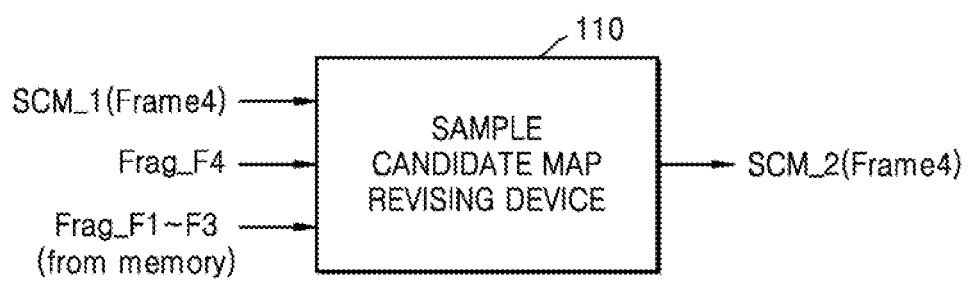
FIG. 17B illustrates an example of types of data applied to and processed by a sample candidate map revising device.

FIGS. 17A and 17B are diagrams illustrating an example in which a sample candidate map revising operation is performed by using data of three or more frames. FIGS. 17A and 17B illustrate an example in which data of four frames is used; however, various other numbers of frames may also be used in embodiments of the inventive concept.

Referring to FIG. 17A, one fragment may be sampled and shaded for each fragment of a 4*4 size. Also, the first sample candidate maps of four consecutive frames may have different patterns, such that a dithering scheme spans four frames and reduces visual artifacts. As an example, the first sample candidate maps SCM_1 of the first to fourth frames Frame1 to Frame4 may be set such that their patterns do not overlap each other.

Referring to FIG. 17B, a sample candidate map revising device may receive a first sample candidate map SCM_1 of a fourth frame Frame4 as a current frame and receive an intermediate-rendering-processed fragment value Frag_4 of the fourth frame Frame4. Also, the sample candidate map revising device may use fragment values Frag_1 to Frag_F3 of first to third frames Frame1 to Frame3 as previous frames. According to an embodiment, the fragment values Frag_F1 to Frag_F4 of the first to third frames Frame1 to Frame3 may be stored in an external memory outside a graphic processor, and the fragment values Frag_F1 to Frag_F4 may be read from the external memory and then provided to the sample candidate map revising device.

Figure 18:
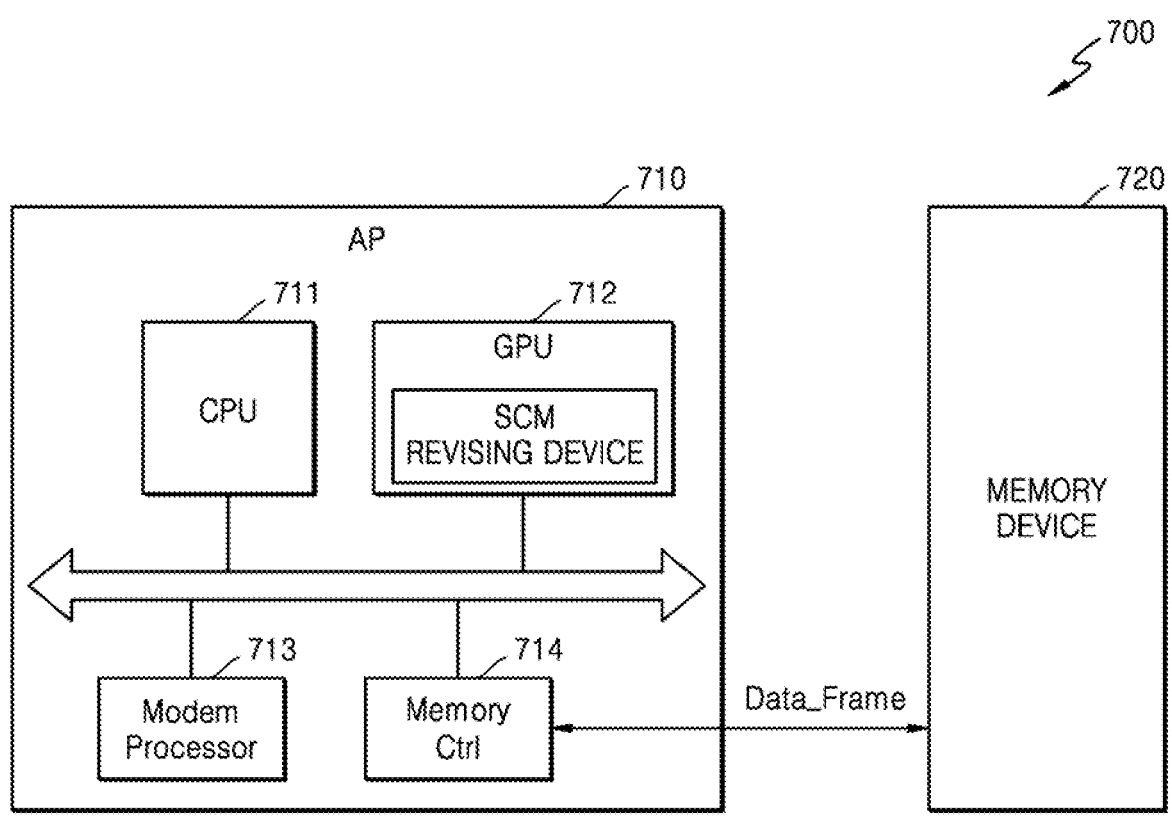
FIG. 18 is a block diagram illustrating an implementation example of a mobile apparatus including a memory device according to an example embodiment of the inventive concept.

FIG. 18 is a block diagram illustrating an implementation example of a mobile apparatus including a memory device according to an example embodiment of the inventive concept.

Referring to FIG. 18, a mobile apparatus 700 may correspond to a rendering system and may include an application processor 710 and a memory device 720. The application processor 710 may be implemented as a system on chip (SoC). The SoC may include a system bus (not illustrated) to which a protocol having a predetermined bus standard is applied, and may include various Intellectual Property (IP) devices connected to the system bus. As illustrated in FIG. 18, as examples of the IP devices, the application processor 710 may include a CPU 711, a GPU 712, a modem processor 713, and a memory control unit 714. Also, since the application processor 710 performs a modem communication function, the application processor 710 may be referred to as ModAP.

The Advanced Microcontroller Bus Architecture (AMB) protocol of Advanced RISC Machine (ARM) Inc, may be applied as the standard of the system bus. The bus types of the AMBA protocol may include Advanced High-Performance Bus (AHB). Advanced Peripheral Bus (APB), Advanced eXtensible Interface (AXI), AXI4, and AXI Coherency Extensions (ACE). In addition, other types of protocols such as uNetwork of SONICS Inc., CoreConnect of IBM, and Open Core Protocol (OCP) of Open Core Protocol International Partnership (OCT-IP) may also be applied.

The GPU 712 may perform the rendering processing described in the above embodiments. Accordingly, the GPU 712 may include a sample candidate map revising device. One or more frame data Data_Frame may be stored in the memory device 720 through the memory control unit 714. Also, the sample candidate map revising device may perform the revising operation in the above embodiments by using the data of the current frame and the data of the previous frame read from the memory device 720.

Various devices described above may be hardware circuitry and form part of an integrated circuit. For instance, sample candidate map (SCM) revising device 110 may be implemented by at least one processing element of an integrated circuit. Thus, the various devices with processing or other functionality may alternatively be called circuits. For instance, SCM revising device 110, 300 or 423, interpolation accuracy determining device 423 may alternatively be called an SCM revising circuit 110, 300 or 423 and an interpolation accuracy determining circuit 423, respectively. Any of the above-discussed processors, generators or drivers may be called a processor circuit, a generator circuit, and a driver circuit, respectively.

The above-described methods according to the present inventive concept can be implemented in hardware, firmware or via the use of software or computer code that can be stored in a recording medium such as a CD ROM, RAM, a floppy disk, a hard disk, or a magneto-optical disk or computer code downloaded over a network originally stored on a remote recording medium or a non-transitory machine readable medium and to be stored on a local recording medium, so that the methods described herein can be rendered using such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing described herein.

The example embodiments of the inventive concept have been described above with reference to the drawings. Although particular terms are used herein to describe the embodiments, they are merely used to describe the technical idea of the inventive concept and are not intended to limit the scope of the inventive concept as described in the following claims. Therefore, those of ordinary skill in the art will understand that various modifications and other equivalent embodiments may be derived therefrom. Thus, the spirit and scope of the inventive concept should be defined by the appended claims.

While the inventive concept has been particularly shown and described with reference to embodiments thereof, it will be understood that various changes in form and details may be made therein without departing from the spirit and scope of the following claims.

What is claimed is:

1. A method of operating a graphic processor, the method comprising:
    performing intermediate rendering by shading-processing some fragments of a first frame by using a first sample candidate map having a first pattern;
    performing intermediate rendering by shading-processing some fragments of a second frame by using a first sample candidate map having a second pattern;
    additionally sampling other fragments of the second frame by using a second sample candidate map generated by changing sampling information of the first sample candidate map having the first pattern or the first sample candidate map having the second pattern, based on comparing a shading processing result of the first frame and a shading processing result of the second frame; and
    performing final rendering, which comprises shading-processing fragments sampled by using the second sample candidate map.

2. The method of claim 1, further comprising performing interpolation processing on remaining fragments of the second frame that are not shading-processed in the intermediate rendering and the final rendering on the second frame.

3. The method of claim 1, wherein the
    final rendering comprises:
    shading-processing other fragments of the first frame, after performing of the intermediate rendering on the first frame; and performing interpolation processing on remaining fragments of the first frame that are not shading-processed in the intermediate rendering and the final rendering on the first frame.

4. The method of claim 1, wherein a position of a fragment in the first frame sampled by the first sample candidate map having the first pattern differs from a position of a fragment in the second frame sampled by the first sample candidate map having the second pattern.

5. The method of claim 1, further comprising selecting any one of a sampling off mode, a fine sampling mode, and a coarse sampling mode,
wherein, when the coarse sampling mode is selected, said other fragments of the second frame are additionally sampled by using the shading processing results of the first frame and the second frame.

6. The method of claim 5, further comprising:
changing an operation mode into the sampling off mode;
receiving a third frame; and
performing rendering by shading-processing all fragments of the third frame.

7. The method of claim 5, further comprising:
changing an operation mode into the fine sampling mode;
receiving a third frame;
performing intermediate rendering by shading-processing some fragments of the third frame by using a first sample candidate map having a third pattern; and
performing final rendering by additionally sampling and shading-processing other fragments of the third frame by using a shading processing result of the third frame,
wherein the third pattern has a higher sampling rate than the second pattern.

8. A graphic processor comprising:
an intermediate rendering processor performing shading processing on some of a plurality of fragments of a current frame according to sampling information of a sample candidate map;
a sample candidate map revising circuit configured to change the sampling information of the sample candidate map to thereby generate a changed sample candidate map, based on a comparison of a shading processing result of a previous frame and a shading processing result of the current frame; and
a final rendering processor performing shading processing on fragments of the current frame additionally sampled according to the changed sample candidate map among the fragments that are not shading-processed by the intermediate rendering processor.

9. The graphic processor of claim 8, further comprising an interpolation processor performing hole filling on a fragment that is not shading-processed by the intermediate rendering processor and the final rendering processor.

10. The graphic processor of claim 8, further comprising a sample candidate map generator generating the sample candidate map according to received pattern information.

11. The graphic processor of claim 10, wherein
the sample candidate map has a first pattern in rendering processing on an odd frame and has a second pattern different from the first pattern in rendering processing on an even frame, and
the previous frame corresponds to the odd frame and the current frame corresponds to the even frame.

12. The graphic processor of claim 11, further comprising a sample pattern generator providing pattern information having the first pattern or the second pattern to the sample candidate map generator according to a frame order.

13. The graphic processor of claim 12, further comprising a pixel extractor receiving fragment values according to the shading processing result of the previous frame, receiving the pattern information having the first pattern from the sample pattern generator when the pattern information having the second pattern is provided to the sample candidate map generator, and providing a fragment value corresponding to the first pattern of the previous frame to the sample candidate map revising circuit.

14. The graphic processor of claim 10, further comprising an interpolation accuracy determining circuit performing interpolation accuracy determination by comparing a value calculated by interpolation processing with a value calculated by shading processing with respect to the same fragment of the current frame,
wherein the sample candidate map generator adjusts a sampling rate of the sample candidate map according to a result of the interpolation accuracy determination.

15. The graphic processor of claim 10, wherein the sample candidate map generator adjusts a sampling rate of the sample candidate map in response to a command from a host.

16. The graphic processor of claim 8, wherein the sample candidate map revising circuit revises the sample candidate map by using the shading processing result of the previous frame and the shading processing result of the current frame when a sampling rate of the sample candidate map is less than a reference value, and revises the sample candidate map by using the shading processing result of the current frame when the sampling rate of the sample candidate map is greater than the reference value.

17. A graphic processor comprising:
a sample candidate map revising circuit configured to receive a first sample candidate map for selecting some of a plurality of fragments with respect to a given frame of a video to be rendered, and generating a second sample candidate map by changing sampling information of the first sample candidate map based on a comparison of shading processing results of at least two frames of the video; and
a fragment processor performing intermediate rendering processing by shading processing on fragments sampled according to the first sample candidate map and performing final rendering processing by shading processing on fragments additionally sampled according to the second sample candidate map.

18. The graphic processor of claim 17, wherein the fragment processor comprises:
an intermediate rendering processor performing the intermediate rendering processing; and
a final rendering processor performing the final rendering processing.

19. The graphic processor of claim 17, further comprising a sample candidate map generator receiving pattern information and generating the first sample candidate map according to the pattern information,
wherein the sample candidate map revising circuit revises the first sample candidate map by using a shading processing result of a previous frame and a shading processing result of a current frame when a sampling rate of the first sample candidate map is less than a reference value, and revises the first sample candidate map by using the shading processing result of the current frame when the sampling rate of the first sample candidate map is greater than the reference value.

* * * * *